US008824086B2

(12) United States Patent
Peng et al.

(10) Patent No.: US 8,824,086 B2
(45) Date of Patent: Sep. 2, 2014

(54) PLASMONIC TRANSDUCER HAVING TWO METAL ELEMENTS WITH A GAP DISPOSED THEREBETWEEN

(71) Applicant: Seagate Technology LLC, Cupertino, CA (US)

(72) Inventors: Chubing Peng, Eden Prairie, MN (US); Kaizhong Gao, North Oaks, MN (US); Lien Lee, St. Paul, MN (US); Amit Itagi, Hugo, MN (US); Michael Allen Seigler, Eden Prairie, MN (US); Yimin Niu, Eden Prairie, MN (US); Sethuraman Jayashankar, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/903,311

(22) Filed: May 28, 2013

(65) Prior Publication Data

US 2013/0294208 A1    Nov. 7, 2013

Related U.S. Application Data

(63) Continuation of application No. 13/231,549, filed on Sep. 13, 2011, now Pat. No. 8,451,705.

(51) Int. Cl.
*G11B 7/135* (2012.01)

(52) U.S. Cl.
USPC ........................................ 360/59; 369/112.23

(58) Field of Classification Search
CPC ..................... G11B 11/10554; G11B 11/1058; G11B 11/10534; G11B 7/1374
USPC .................. 369/13.13, 13.17, 112.23, 112.27, 369/13.24; 360/59, 55, 128, 110; 385/131, 385/181
See application file for complete search history.

(56) References Cited

U.S. PATENT DOCUMENTS

| 7,170,713 | B2 * | 1/2007 | Gider et al. ..................... 360/128 |
| 7,212,367 | B2 * | 5/2007 | Clinton et al. ................... 360/55 |
| 7,330,404 | B2 | 2/2008 | Peng et al. |
| 7,706,654 | B2 * | 4/2010 | Peng et al. ...................... 385/131 |
| 8,248,891 | B2 * | 8/2012 | Lee et al. ...................... 369/13.17 |
| 2010/0097901 | A1 | 4/2010 | Challener |
| 2010/0123965 | A1 | 5/2010 | Lee et al. |
| 2010/0328807 | A1 | 12/2010 | Snyder et al. |
| 2011/0002199 | A1 | 1/2011 | Takayama et al. |
| 2013/0064502 | A1 | 3/2013 | Peng et al. |

\* cited by examiner

*Primary Examiner* — Nabil Hindi
(74) *Attorney, Agent, or Firm* — Hollingsworth Davis, LLC

(57) ABSTRACT

An apparatus includes a waveguide configured to deliver light to a transducer region. The apparatus also includes a plasmonic transducer that has two metal elements configured as side-by-side plates on a substrate-parallel plane with a gap therebetween. The gap is disposed along the substrate-parallel plane and has an input end disposed proximate the transducer region and an output end. The transducer is configured to provide a surface plasmon-enhanced near-field radiation pattern proximate the output end in response to the light received by the waveguide.

18 Claims, 18 Drawing Sheets

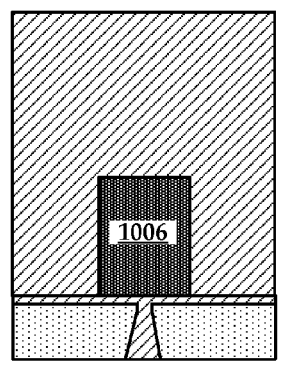 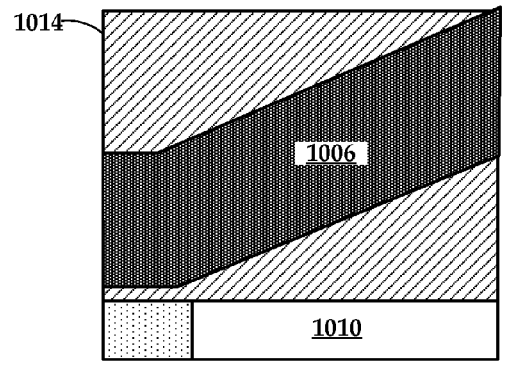
FIG. 10A  FIG. 10B
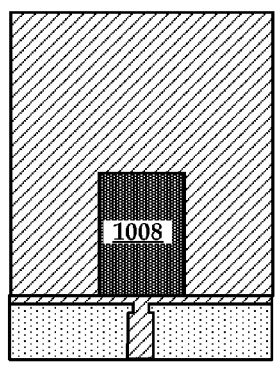 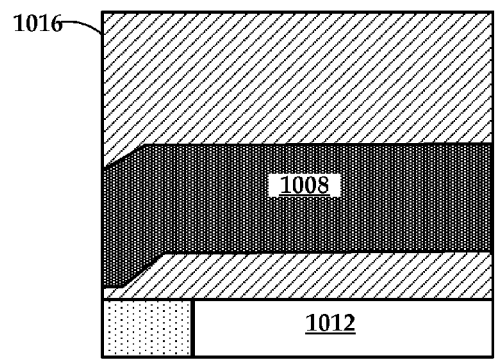
FIG. 10C  FIG. 10D

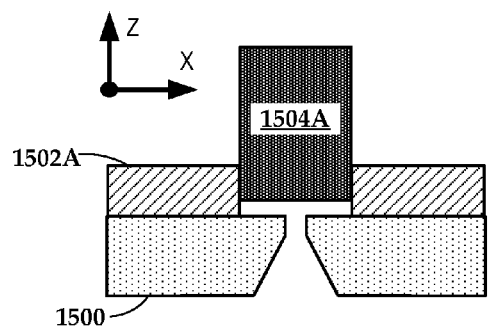
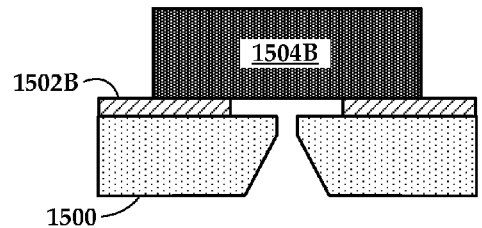
FIG. 15A                FIG. 15B
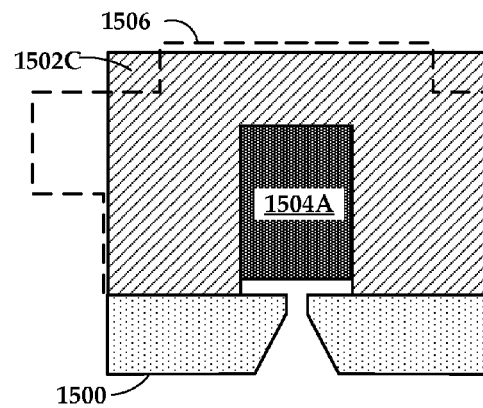
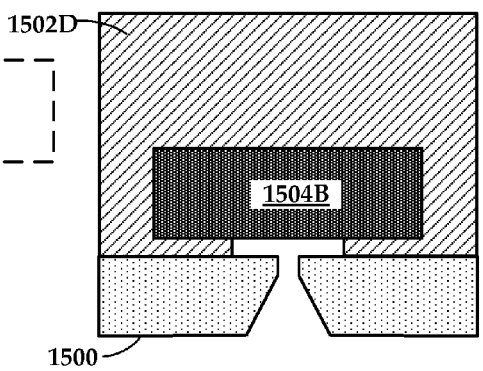
FIG. 15C                FIG. 15D
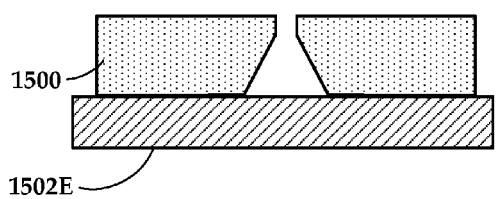
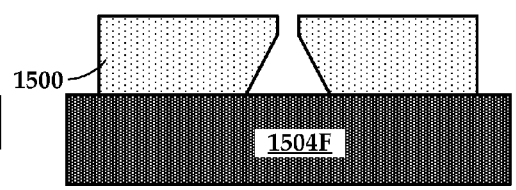
FIG. 15E                FIG. 15F

PLASMONIC TRANSDUCER HAVING TWO METAL ELEMENTS WITH A GAP DISPOSED THEREBETWEEN

CROSS REFERENCE TO RELATED CASES

This is a continuation of U.S. patent application Ser. No. 13/231,549, filed Sep. 13, 2011, now U.S. Pat. No. 8,451,705 which is hereby incorporated by reference in its entirety.

SUMMARY

Various embodiments described herein are generally directed to a near-field transducers that may be used, e.g., for heat assisted magnetic recording. In one embodiment, an apparatus includes a waveguide configured to deliver light to a transducer region. The apparatus also includes a plasmonic transducer that has two metal elements configured as side-by-side plates on a substrate-parallel plane with a gap therebetween. The gap is disposed along the substrate-parallel plane and has an input end disposed proximate the transducer region and an output end. The transducer is configured to provide a surface plasmon-enhanced near-field radiation pattern proximate the output end in response to the light received by the waveguide. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 10A and 10C are views on an air bearing surface plane of near-field transducers and recording poles according to additional example embodiments;

FIGS. 10B and 10D are cross sectional views of the near-field transducers and recording poles shown in FIGS. 10A and 10C;

FIGS. 15A-15F, 16A-16D, and 17A are cross-sectional diagrams of slider sections illustrating heat sinking features according to example embodiments;

FIGS. 18A-18B are graphs illustrating analytical models used to predict temperature profiles in a recording media according to embodiments.

DETAILED DESCRIPTION

Figure 1A:
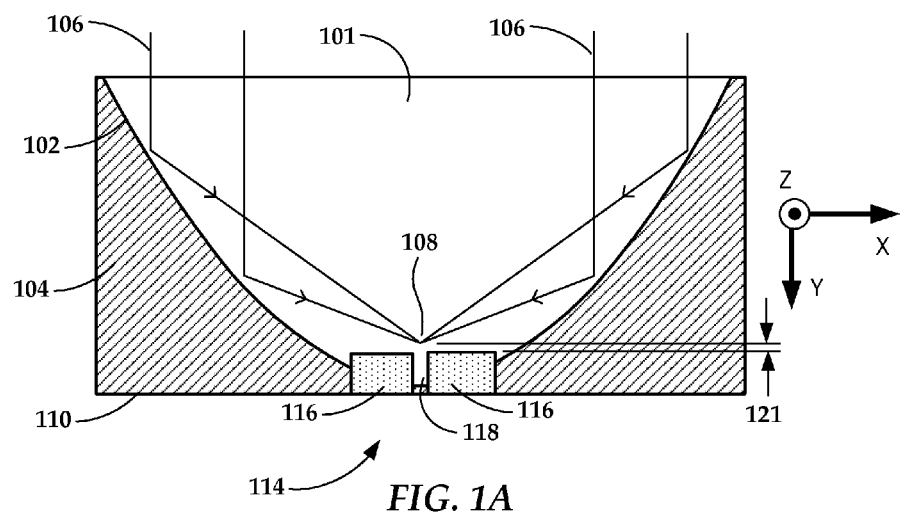
FIGS. 1A and 2 are cross-sectional diagrams of an integrated optical focusing element and near-field transducer according to an example embodiment.

The present disclosure relates to optical components used in applications such as heat assisted magnetic recording (HAMR). A HAMR device utilizes a magnetic recording media (e.g., hard disk) that is able to overcome superparamagnetic effects that limit the areal data density of typical magnetic media. In order to record on this media, a small portion of the media is locally heated while being written to by a magnetic write head. A coherent light source such as a laser may provide the energy to create these hot spots, and optical components, e.g., built in to a slider that houses the write head, are configured direct this energy onto the media.

When applying light to a HAMR medium, the light is concentrated into a small hotspot over the track where writing is taking place. In order to create this small hot spot, energy from a light source (such as a laser that is integral to or separate from the write head) may be launched into a waveguide integrated into a hard drive head. The light propagates through the waveguide and may be focused on to an optical near-field transducer (NFT) by a focusing element. Example NFT transducers may include a plasmonic optical antenna or a metallic aperture. Example focusing elements may include solid immersion lenses (SIL) and solid immersion mirrors (SIM).

The NFT may be located at an air bearing surface (ABS) of a slider, and may be placed in close proximity to a write head that is also part of the slider. This co-location of the NFT with the write head facilitates heating the hot spot during write operations. The waveguide and NFT may be formed as an integral part of the slider that houses the write head. Other optical elements, such as couplers, mirrors, prisms, etc., may also be formed integral to the slider. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may transfer light between components via rectangular dielectric slab waveguides that are built up on a substrate using layer deposition techniques. These waveguides may be formed as a layer of materials with appropriate relative refractive indices so that light propagates through the waveguide in a similar fashion as through an optic fiber.

As a result of what is known as the diffraction limit, optical components cannot be used to focus light to a dimension that is less than about half the wavelength of the light. The lasers used in some HAMR designs produce light with wavelengths on the order of 800-900 nm, yet the desired hot spot is on the order of 50 nm or less. Thus the desired hot spot size is well below half the wavelength of the light, and optical focusers cannot be used to obtain the desired hot spot size, due to diffraction. As a result, an NFT is employed to create these hotspots on the media.

The NFT is a near-field optics device designed to reach local surface plasmon conditions at a designed wavelength. A waveguide and/or other optical element concentrates light on a transducer region (e.g., focal region) near which the NFT is located. The NFT is designed to achieve surface plasmon resonance in response to this concentration of light. At resonance, a high electric field surrounds the NFT due to the collective oscillations of electrons at the metal surface. Part of this field will tunnel into a storage medium and get absorbed, thereby raising the temperature of a spot on the media as it being recorded.

Figure 2:
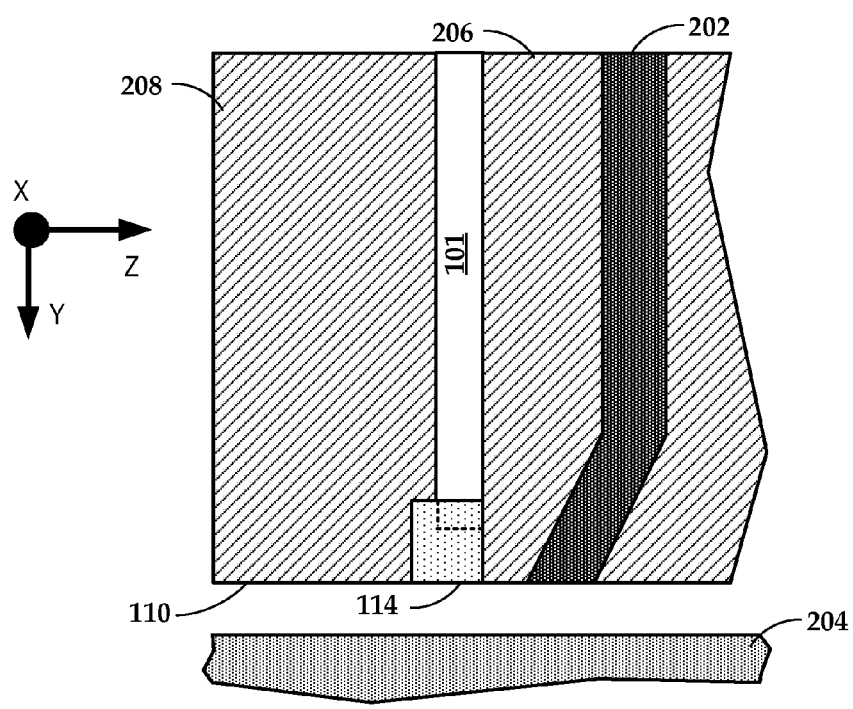

In reference now to FIGS. 1A and 2, cross-sectional diagrams illustrates an integrated optical focusing element according to an example embodiment. As shown in FIG. 1A, this embodiment includes waveguide core 101 that directs light rays 106 to a planar SIM (PSIM), here indicated by way of SIM sidewall 102. The waveguide core 101 may be formed from any material that has a higher index of refraction than cladding (e.g., see waveguide cladding layers 206, 208 in FIG. 2). For example, the waveguide core 101 may be made from $Ta_2O_5$, $TiO_2$, ZnS, SiN, and the cladding 206, 208 may be made from $Al_2O_3$, $SiO_2$, $Y_2O_3$, $HfO_2$, $MgF_2$, $MgO_2$, $SiON_x$, AlN. The cladding layers 206, 208 may each be made of a different material. The core 101 and cladding layers 206, 208 may generally be part of a light delivery system that receives light from a source (e.g., laser diode) and directs it to the SIM 102. These and other components may be built on a common substrate (not shown) using wafer manufacturing techniques known in the art.

The SIM 102 may be formed as a parabolic cutout of surrounding dielectric waveguide material 104 (e.g., $Al_2O_3$, $SiO_2$, SiOxNy, MgO, $HfO_2$, $Y_2O_3$, $Ta_2O_5$, TiOx). The cutout may be formed from/coated with a reflective material (e.g., Au, Al), so that light rays 106 entering the PSIM 102 by way of waveguide core 101 are focused to a focal region 108. The focal region 108 is proximate an air bearing surface 110, and the focused light 106 is directed out of the air bearing surface 110 (in the positive y-direction as seen in FIG. 1) to be absorbed by storage media (not shown). While the embodiments described below may be described being used with a focusing element such as a SIM or SIL, other embodiments may not require these elements, or may use different elements. For example, incident waves could be launched onto the NFT directly from a waveguide, e.g., a channel or planar waveguide.

An NFT is a transducer that can be made of any known plasmonic material (e.g., Au, Ag, Cu) and may be positioned at or near the focal region 108 to further direct the energy to the air-bearing surface 110 (ABS). In some configurations, the NFT may be may be configured as a single piece of plasmonic material shaped like a tapered pin or circular disk with a peg attached (e.g., shaped like a lollipop). Such an NFT design (hereinafter referred to as a "one-piece NFT") may have one end disposed near the focal region 108 and extend downwards (in the positive y-direction) to the ABS 110. Electric fields are excited on the surface of the NFT, and these fields are directed out to the air bearing surface 110 for delivery to the media. A magnetic pole (e.g., pole 202 in FIG. 2) is positioned proximate the NFT (e.g., above or below the NFT in the z-direction) and applies magnetic fields to the heated media (e.g., media 204 in FIG. 2) during recording. The recording pole 202 may be configured for perpendicular recording.

An analysis was performed for a one piece NFT configuration that was optimized for light wavelength $\lambda$=830 nm. This design was a disk-peg configuration, with disk diameter of 200 nm, thickness 30 nm (along the z-direction), and the protruded peg length 15 nm (along the y-direction). At resonance, over 10% of the applied optical energy is absorbed by this one-piece NFT. This resulted in raising the NFT to high enough temperatures that component damage could result. A similar result would be expected for other one-piece NFT designs, e.g., a straight or tapered elongated peg.

In order to alleviate negative effects of high temperatures, a one-piece NFT can be thermally coupled to the magnetic pole via a heat sink. A heat sink may prevent failure of the one piece NFT due to overheating under some conditions. Even with the heat sink, however, temperatures induced during recording in a one-piece NFT of may be high enough to cause material diffusion between the NFT, pole, and heat sink. This reduces NFT efficiency and also reduces the magnetic moment of the recording pole.

Another effect that may be seen with a one-piece NFT involves the generation of side-lobes that could cause unintended recording/erasure outside the hotspot. A one-piece NFT with non-smooth outer contours (e.g., disk/peg configuration) is excited by a longitudinally polarized optical spot with the electrical field along the y-direction. On either side of this optical spot there may be another optical spot that is polarized transversely, e.g., with the electric field along the x-direction. The peak-to-peak spacing between the two transversely polarized optical spots in the analyzed case was estimated as approximately 350 nm at wavelength $\lambda$=830 nm. These fields will be coupled into the storage media, resulting in potential side-lobe recording/erasure. Attempts to block the two side-lobes may eventually decrease the NFT efficiency and raise the local temperature of the device.

Figure 1B:
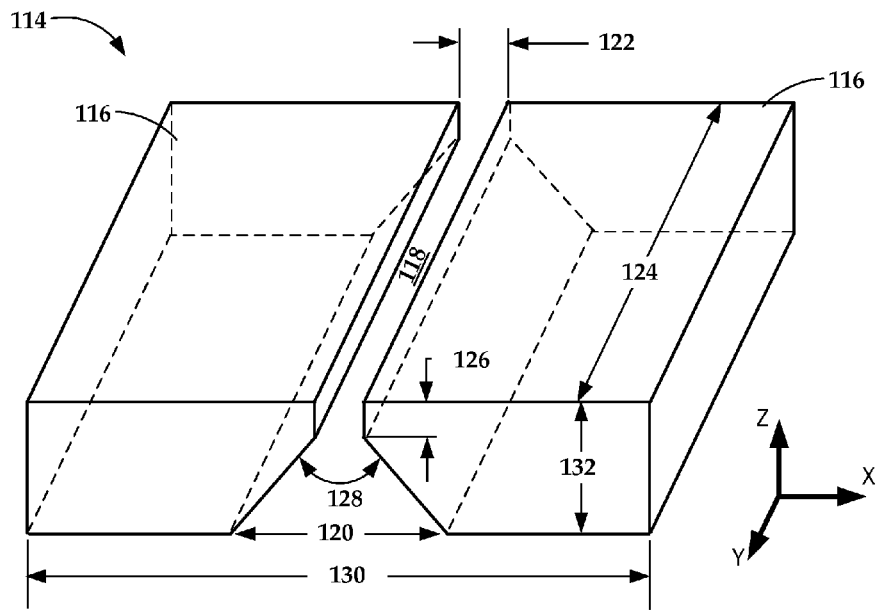
FIG. 1B is a perspective view of a near-field transducer according to an example embodiment.

As a result of the above, an alternate NFT design 114 is shown in FIGS. 1A, 1B, and 2. This alternate NFT 114 includes a ridge waveguide core 118 (also referred to herein as a "ridge waveguide," "gap," and/or "notch") with plasmonic metal cladding. The cladding may be formed of two metal elements 116 that are generally plate or bar shaped, and arranged side-by-side on a common plane (e.g., xy-plane which may be parallel to plane of the wafer substrate) with the gap 118 therebetween (see FIG. 1B). The gap 118 has a wider bottom opening dimension 120 ($W_b$) than at the top 122 (W). The narrower top opening 122 may be placed in proximity to a recording head.

As seen in FIG. 1A, the PSIM 102 focuses a transverse electric (TE) polarized light into an input end of the ridge waveguide 118. In this illustration, the NFT 114 is shown disposed above the bottom of the SIM 102, with the input end separated from the focal region 108 by distance 121. It will be appreciated that distance 121 may be negative, that is the focal region may be situated inside the NFT 114 in some configurations. In other configurations, the input end of the NFT 114 may be placed below the SIM 102, e.g., extending further down beyond the focal region 108 (in the positive y-direction). Similarly, while the output end of the NFT 114 is shown extending flush with the ABS 110, the waveguide core 118 (and/or metal elements 116) may be terminated above the ABS to improve coupling efficiencies.

The metal cladding elements 116 provide a surface plasmon-enhanced near-field radiation pattern proximate the output end in response to the light received by the SIM 102. Light waves propagating through the ridge waveguide 118 bend upward toward the narrow gap 122, which has a higher effective refractive index than the bottom gap 120. Local surface-plasmon resonance may be reached by tuning the bottom open width $W_b$ 120, height 132, and the overall width 130 at a desired excitation wavelength. The waveguide length 124 (L) can be optimized at Fabry-Perot resonance. Resonance and light focusing capability of this configuration 114 result in large amount of optical energy condensed inside the gap 118 and out of the air-bearing surface 110, where it is then coupled into a storage medium for heat assisted recording.

The NFT 114 can be self heat-sinked due to its relatively large width 130 along the x-direction. This allows an oxide dielectric material to be placed between the NFT 114 and magnetic recording pole, thereby preventing diffusion between the NFT 114 and pole material. This NFT 114 configuration may also be usable to achieve small optical spots in recording media with no plasmonic layer. Direct coupling from the PSIM focusing to a data storage medium is minimal due to the small ridge cross section, large width 130, and length 124. This design 114 can reduce or eliminate PSIM side-lobe recording or erasure.

This NFT design 114 may also have useful thermo-mechanical properties. With one-piece NFT designs, substantial amounts of energy may be converted into heat within an elongated portion proximate the ABS 110. Due to relatively small dimensions of the elongated portion, energy density at this portion of the one-piece NFT can be an order of magnitude higher then it is elsewhere in the NFT, resulting in significant localized heating. Other heated components in the head (coils, heaters, etc.) may employ the ABS 110 as a heat sink, but only a small surface area of a one-piece NFT may expose to the ABS 110 (e.g., in configurations where the NFT is surrounded with a dielectric such as $Al_2O_3$). One way to remove excess heat from a one-piece NFT design is to connect the NFT to the recording pole tip through a heat sink (e.g., a gold-cylinder). However, the pole tip may also be of a reduced size to accommodate a smaller magnetic footprint, and this may result in the pole tip being heated up excessively. If the pole tip is heated enough, this will lower a thermal gradient between pole tip and NFT, and make the heat sinking less effective.

The waveguide NFT design 114 can be designed to minimize such thermal issues. In the waveguide NFT 114, there are no relatively small features that make it difficult for thermal energy to dissipate. In some thermal modeling (shown in detail below) most of the energy was found to be absorbed in vicinity of the sharp gold corner at the ABS surface, with energy density being at the similar level to energy density being absorbed in the one-piece NFT. Temperature elevation at this corner is reduced, due in part to the output end of the cladding portions 116 being directly exposed to the ABS 110, and also due to the cladding portions including relatively large areas of highly thermally conductive material (e.g., gold).

For example, in one configuration, the surface area of a one-piece NFT exposed to the ABS 110 is approximately 900 $nm^2$. In a similar context, the area of the waveguide NFT 114 that would be exposed to ABS 110 is 190,000 $nm^2$, at least two orders of magnitude higher. Ballistic transport of heat away from at ABS 110 is directly proportional to the available surface area. Thus the waveguide NFT design 114 can take advantage of significantly increased heat sinking from the ABS 110.

To demonstrate the performance of NFT design 114, an example structure was numerically modeled to determine optical, near-field, and thermo-mechanical performance. The NFT 114 was modeled to select optimum values of the bottom width $W_b$ 120 and length 124, with the top gap width 122 and top gap height 126 both being set at 30 nm. The angle 128 was set to 30 degrees, and the total length of the two metal pieces plus the gap along the x-direction (dimension 130) was 630 nm. For the following simulations, the ridge bottom width dimension 120 ($W_b$) was set as 100 nm, and length 124 was set as 280 nm. The total metal thickness 132 (H) was set as 150 nm. These dimensions are purely for purposes of illustration. For example, it is expected that the top gap height could be smaller or zero, effectively forming a sharp corner along the upper edge of the gap 118.

Figure 3A:
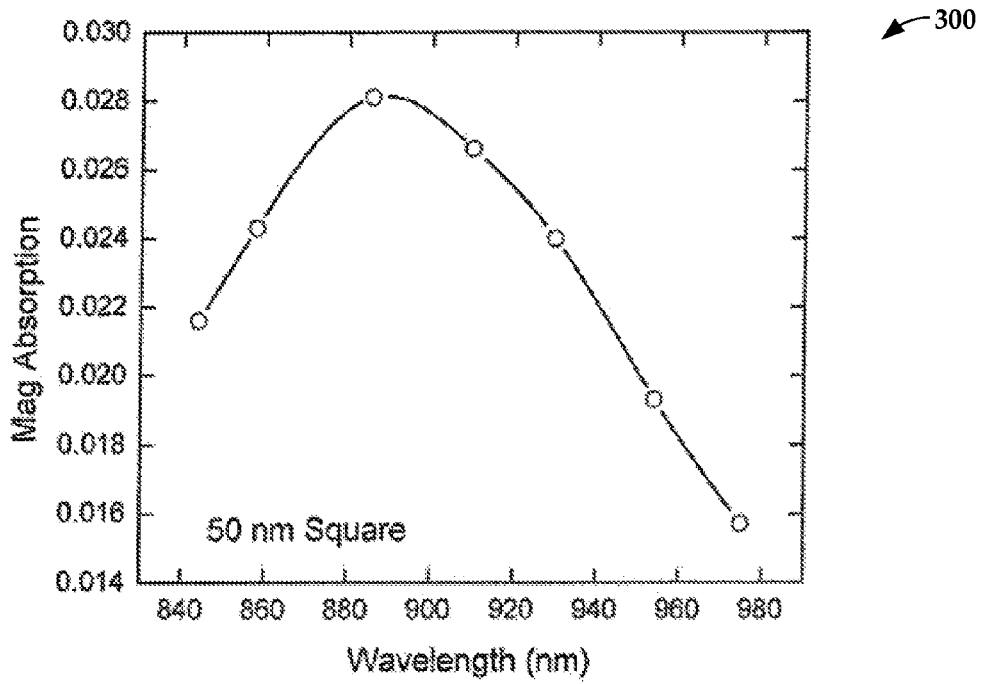
FIG. 3A is a graph showing simulation results of light absorbed in storage layer as a function of wavelength according to an example embodiment.
Figure 3B:
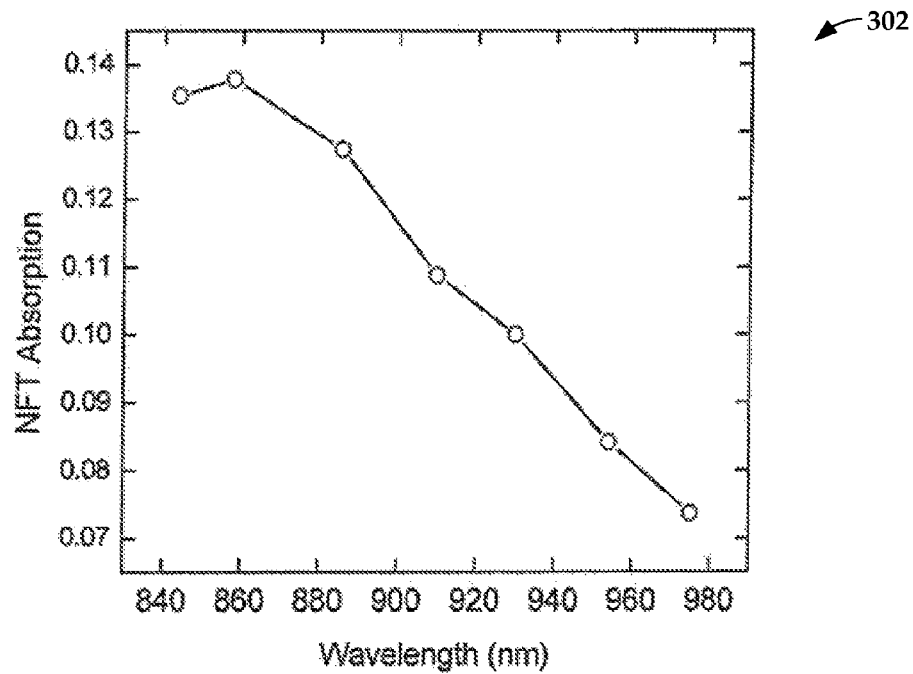
FIG. 3B is a graph showing simulation results of light absorbed in a near-field transducer as a function of wavelength according to an example embodiment.

In FIG. 3A, a graph 300 shows the light absorbed in a FePtCuC storage layer resulting from the simulation. The light was absorbed in a volume of 50 nm×50 nm times the storage layer thickness. This illustrates that the NFT 114 of this configuration is suitable for use with wavelengths between 870 to 900 nm. Seen in graph 302 of FIG. 3B is a plot indicating the light absorbed in the NFT a function of excitation wavelength. In this modeling it was assumed that the planar waveguide is a 150-nm thick $Ta_2O_5$ core with index of refraction n=2.09, cladded by $Al_2O_3$ of n=1.65. The ridge NFT core 118 was also $Al_2O_3$ and cladded by gold metal (metal cladding elements 116). The storage medium was modeled as a 12.6-nm thick FePtCuC magnetic layer of n=2.54+j 1.527 and a 20 nm thick MgO layer of n=1.7 on a silicon substrate. The head-medium spacing (HMS) was set as 8 nm with effective index of refraction n=1.2116. The PSIM 102 was modeled as 50 μm wide at the top opening and 100 μm long (in the y-direction). The incident beam was TE mode normal to the waveguide plane (xy-plane) and Gaussian parallel to the waveguide plane with $1/e^2$ intensity radius 24 μm. The total optical power flowing onto the PSIM 102 is 1 watt.

As shown in graph 300, the coupling efficiency (CE) in this simulation exhibits resonance, which peaks at λ=890 nm. The 90% CE range is 58 nm in wavelength wide. The light absorption of the media as seen in graph 300 peaks below the absorption in NFT seen in graph 302, the latter being 12% at the peak resonance CE wavelength of λ=890 nm. In some applications, it may be desirable to use a longer wavelength, for instance, λ=980 nm, to reduce dissipation in the NFT.

Figure 4A:
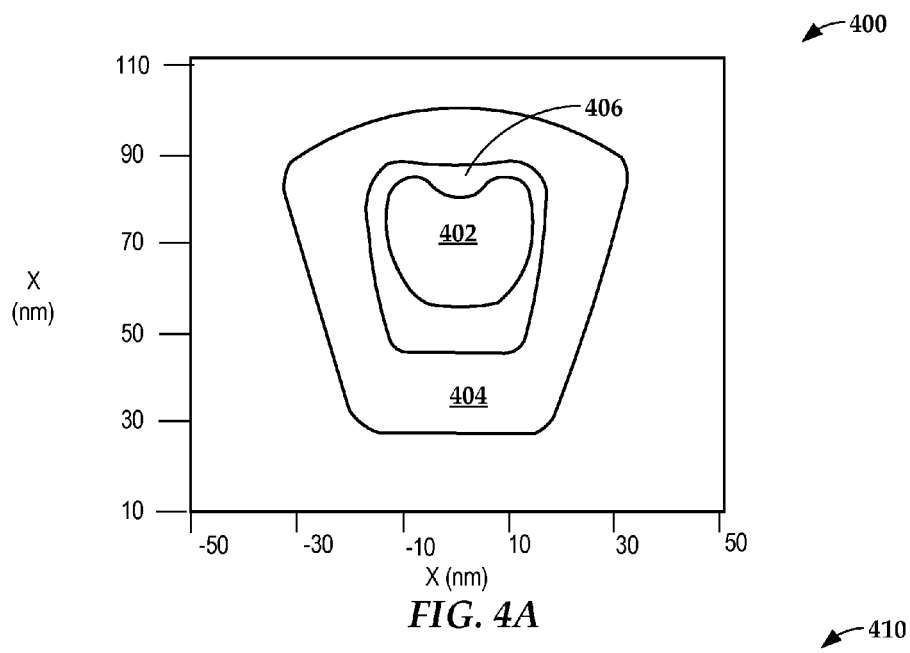
FIG. 4A is a graph illustrating an estimated distribution of electric field strength in a recording media according to an example embodiment.

In reference now to FIG. 4A, a graph 400 illustrates an estimated distribution of electric field strength ($E^2$) in the media at 2 nm below the storage layer for light having wavelength λ=910 nm. The displayed electric field has been multiplied by λ. The spacing 121 between the NFT 116 and the focal point 108 is 40 nm long and filled with $Al_2O_3$. The maximum field strength of region 402 is between 13000 and 14800 $volt^2$ and field strength in the outer region 404 is between 5870 and 9460. It can be seen from graph 400 that the electric field strength $E^2$ in the medium generally has a teardrop shape, and the $E^2$ profile bends inward at region 406 from the top of the gap, where a magnetic pole will be placed. This field profile will yield a flat thermal profile, which can provide a smaller effective thermal hotspot for writing straight magnetic transitions. Modeling also shows that if the head-medium spacing decreases to 5 nm, this inward field profile 406 is even more pronounced. The full-width-at-half-maximum (FWHM) optical spot at the middle of the storage layer is 42 nm along the x-direction (cross track) and 62 nm along the z-direction (down track) for the 30 nm gap at the 8 nm head-medium spacing.

Figure 4B:
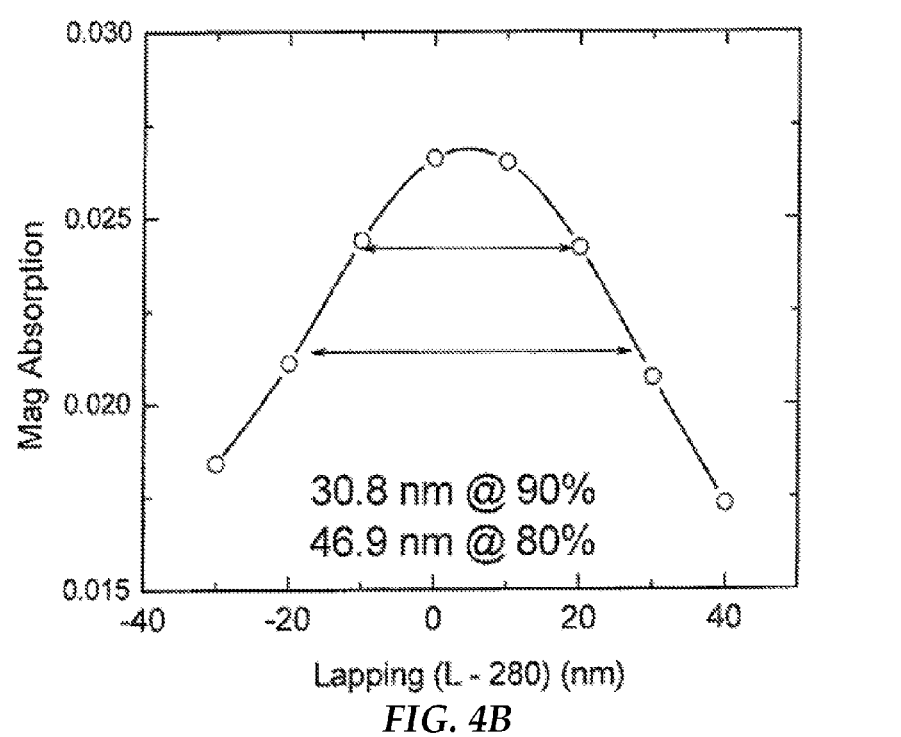
FIG. 4B is a graph illustrating estimated effect on absorption as a function of waveguide length lapping tolerances.

Another consideration in NFT design relates to lapping tolerance. Lapping tolerance refers to dimensional tolerances of the lapping process used to bring the integrated optical components to final dimension. In FIG. 4B, a graph 410 shows the estimated effect of waveguide length lapping tolerances on absorption at the media (wavelength $\lambda$=910 nm). This example assumes a nominal waveguide length 124 of 280 nm. As with FIG. 3A, the absorption refers to light absorbed in a FePtCuC storage layer in a volume of 50 nm×50 nm times the storage layer thickness. The resulting curve represents a variation in the absorption versus ridge waveguide length due to lapping tolerance. At 90% CE, the lapping tolerance is approximately 30 nm, which is reachable using current processes.

Figure 5A:
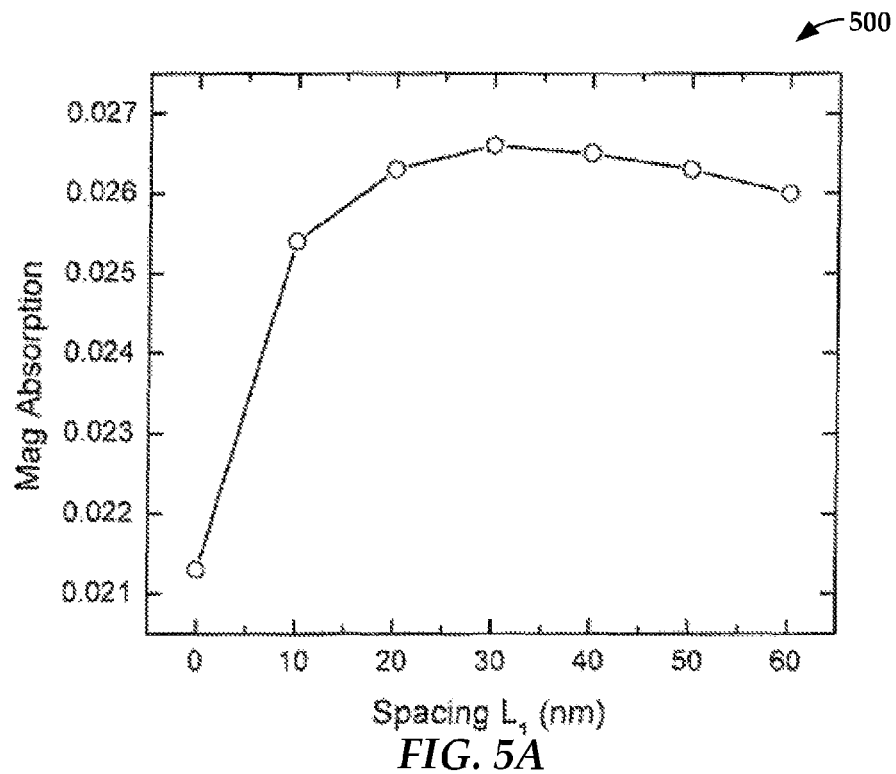
FIG. 5A is a graph illustrating a calculated measure of efficiency related to spacing between the light delivery components and near-field transducer as shown in the example embodiments.

In reference now to FIG. 5A, a graph 500 shows a calculated measure of NFT efficiency related to spacing between the light delivery components (e.g., waveguide, SIM) and NFT as shown in the example embodiments. In this example, the absorption (measured similarly to the absorption described in FIGS. 3A and 4B) is calculated based on varying the spacing 121 ($L_1$) between the focal point 108 in the planar waveguide core 101 and the ridge waveguide of the NFT. This graph 500 shows that the NFT efficiency increases by approximately 20% at spacing $L_1$=20 nm and is peaked at $L_1$=30 nm. At $L_1$=60 nm, the CE is only slightly decreased from its peak value.

Figure 5B:
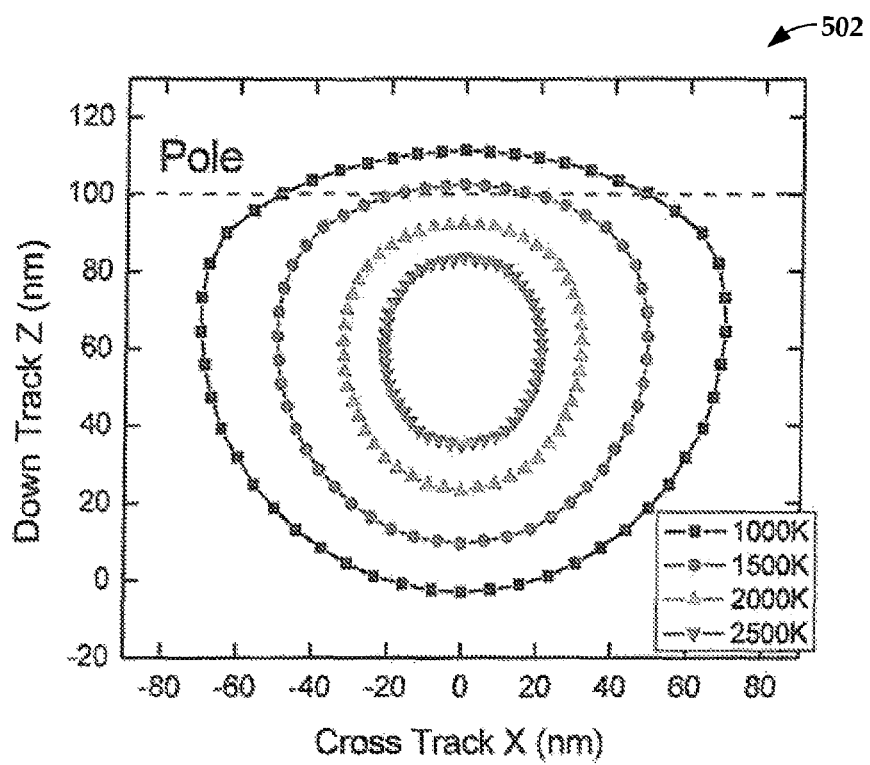
FIG. 5B is a graph illustrating isothermal contours near the magnetic pole according to a thermal analysis of the example embodiments.
Figure 6A:
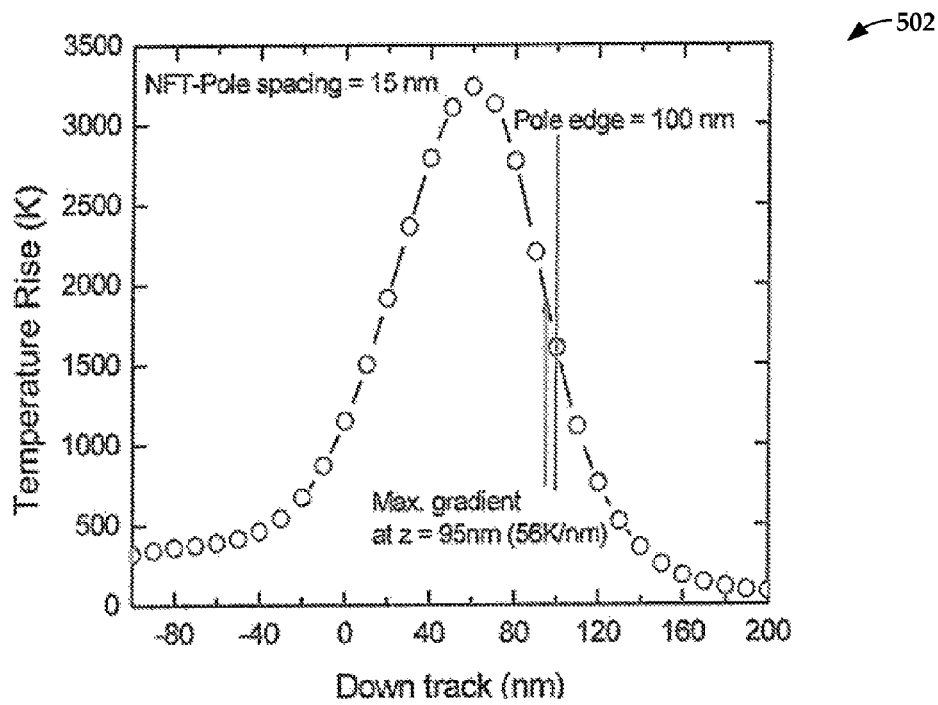
FIG. 6A is a graph showing the temperature rise versus down track location for example embodiments under the same conditions as in FIG. 5B.

To demonstrate the NFT performance for magnetic recording, a $Fe_{55}Co_{45}$ magnetic was modeled as being placed near the NFT (e.g., see pole 202 in FIG. 2). The simulation uses a staircase pole, with 15 nm step every 20 nm. The NFT-pole distance is 15 nm near the air-bearing surface 110. For this modeling, it is assumed the media 204 has an Fe storage layer. The presence of the FeCo pole decreases the NFT efficiency by 30%. In reference now to FIG. 5B, a graph 502 shows isothermal contours near the magnetic pole according to example embodiments. The isothermal contours in graph 502 represent respective temperature rise of 1000, 1500, 2000, and 2500 K in response to 1 ns of irradiation at 100 mW. In FIG. 6A, a graph 600 shows the temperature rise versus down track location (in the z-direction) at x=0 under the same conditions as FIG. 5B. These graphs 502, 600 demonstrate that a low curved thermal contour can be obtained near the pole for magnetic recording, with the maximum thermal gradient being about 5 nm away from the pole. If the head-media spacing drops to 5 ns, the isothermal contour is almost flat near the pole, which renders a sharp magnetic transition.

Figure 6B:
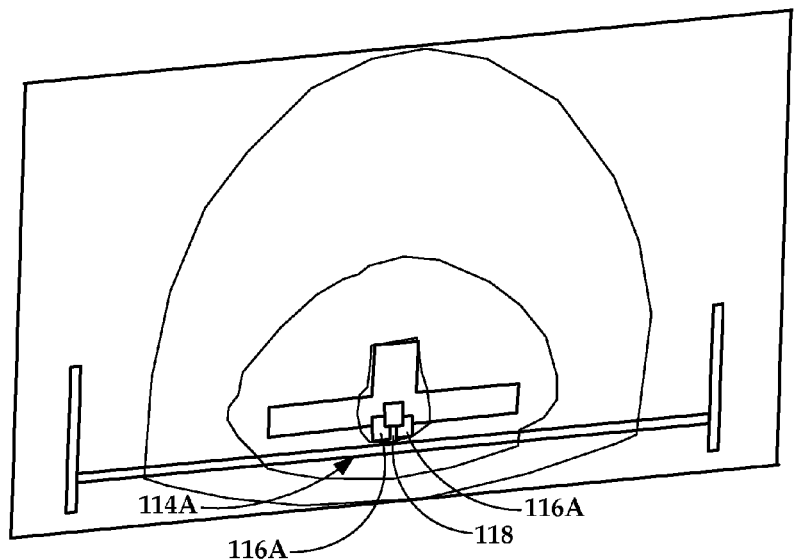
FIG. 6B is a diagram showing the results of finite element thermal modeling at the plane of the air bearing surface according to an example embodiment.
Figure 7A:
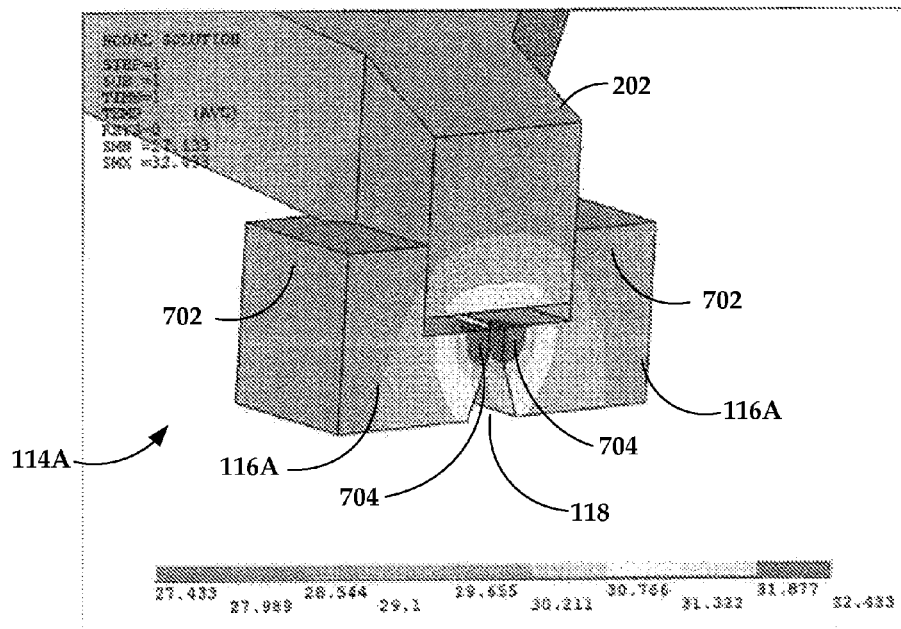
FIG. 7A is a perspective view of finite element thermal modeling results according to an example embodiment.

A finite element, thermo-mechanical analysis was performed to calculate maximum temperature in this NFT design, the NFT being designated here by reference numeral 114A. A result of this modeling at the plane of the ABS is shown in FIG. 6B, and a perspective view, close up is seen in FIG. 7A. As shown in FIG. 7A, the NFT 114A uses modified gold cladding elements 116A with extensions 702 that reach up near to the recording pole 202 so that the pole 202 provides some level of heat sinking The pole is 300 nm wide and the NFT is 630-nm wide (measured along the x-direction as seen in FIG. 1B). The portions 116A were modeled as gold. While published values of thermal conductivity for gold are around 318 W/mK, it has been found that the thermal conductivity of thin gold films decrease with decreasing film thicknesses. Thermal conductivity for the portions 116A was estimated as 110 W/mK.

As can be seen in FIG. 7A, the maximum temperature is reached at the ABS surface at the corners 704 of the NFT 114A that correspond to the narrow portions of gap 118. The steady-state temperature elevation over ambient at the maximum temperature point is 7.4 K. A similar finite element analysis was performed for a one-piece configuration under the same loading conditions (same air-bearing design, same disk rotational speed, same amount of incident power, etc.). In that case, the maximum temperature was reached at the NFT where it meets the ABS, and the temperature elevation was 14.9 K for NFT thermal conductivity of 110 W/mK, which is about twice the temperature elevation of the waveguide NFT.

Because the thickness of the waveguide NFT is about five or more times that of the one-piece NFT, the effective thermal conductivity of the gold will change between the two designs. In the case of the current NFT 114A, thermal conductivity is around 110 W/mK, compared to 50 W/mK estimated for 50 nm thin film, or even 30 W/mK, estimated for 25 nm thin film, either of which could be the case for a one-piece NFT. Another set of analysis was run for one-piece NFT using thermal conductivities of 50 W/mK, and 30 W/mK, which resulted in temperature elevation of 21.9K, and 29.2K, respectively. In contrast, using similar reduced thermal conductivities for the configuration 114A shown in FIG. 7A showed temperature elevation of 33% and 25%, respectively, when compared to the same values applied to the one piece NFT.

Figure 7B:
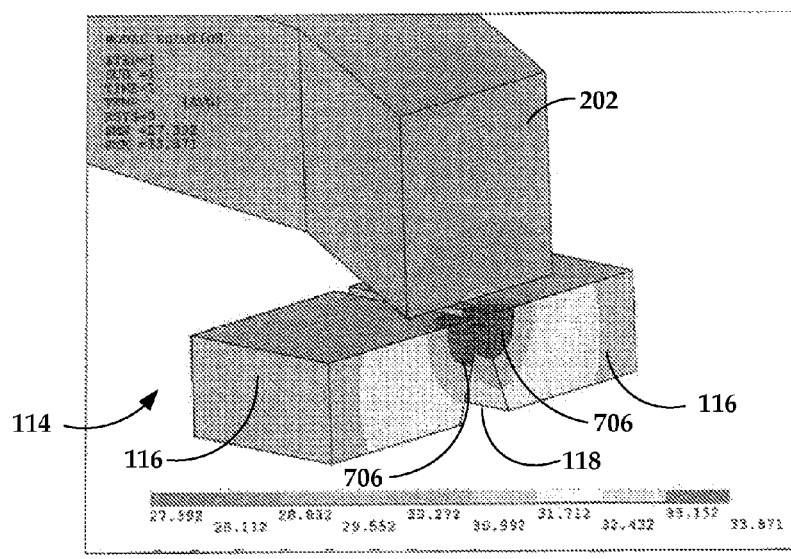
FIG. 7B is a perspective view of finite element thermal modeling results according to another example embodiment.

Another finite element thermal analysis was performed using the NFT configuration 114 seen in FIG. 7B. In this configuration, the gold portions 116 are of a geometry similar to that shown in FIG. 1B. As in FIG. 7A, the pole is 300 nm wide and the NFT is 630 nm wide. The separation of the gold portions 116 from the recording pole 202 (e.g., via dielectric material) results in there being reduced heat sinking provided by the pole 202. The maximum temperature elevation in this example is 8.9 K at regions 706 using effective NFT thermal conductivity of 110 W/mK. While this temperature elevation is slightly higher than the 7.4 K seen in the heat sinked version of FIG. 7A, this shows nonetheless that cooling through the ABS surface dominates in this type of NFT configuration 114, 114A.

In general, it is estimated that out of 1 mW of incident power delivered to these different NFT configurations, 20.38% is converted into heat for a one-piece NFT and 17.9% is converted into heat for the current design 114, 114A. Therefore this latter configuration 114, 114A provides a robust thermo-mechanical solution to delivering energy to a recording media. Configuration 114, 114A should operate with relatively low maximum temperature, and reduce heating of the recording pole tip.

Figure 8A:
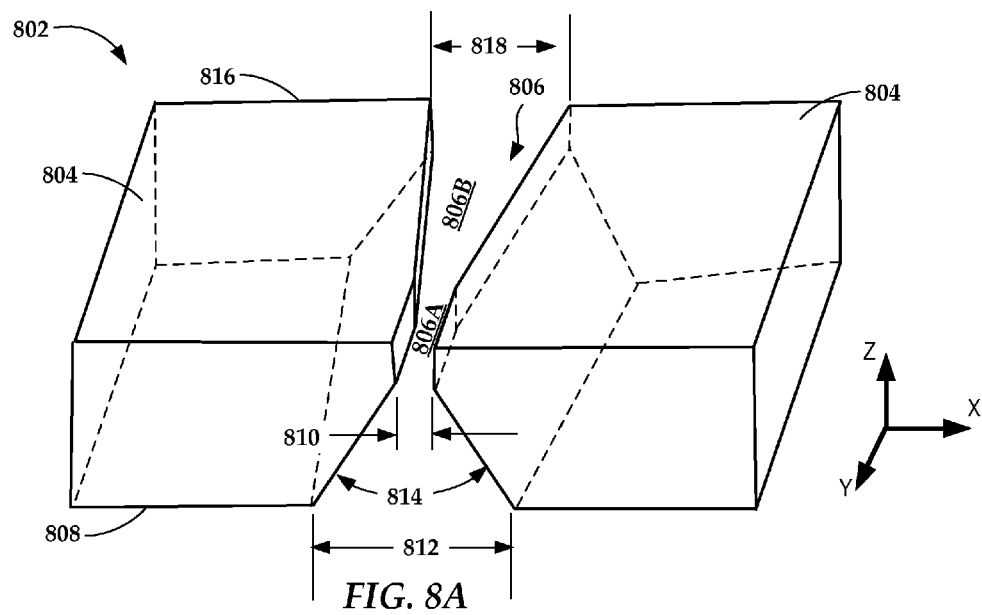
FIGS. 8A and 8B are perspective views of a waveguide near-field transducers according to other example embodiments.

In reference now to FIG. 8A, a perspective view illustrates a waveguide NFT configuration 802 according to another example embodiment. As with the previous configuration, the NFT 802 includes metal elements 804 that surround a dielectric gap 806. The metal elements 804 may be made of a plasmonic material, e.g., gold, silver. At a first end 808 of the NFT 802 (e.g., output end that faces the ABS) the core gap 806 includes a narrow portion 810 that transitions to a wider portion 812 at angle 814. At the opposite end 816 of the waveguide 802 (e.g., end that faces the SIM and/or light delivery waveguide), the narrow portion 810 from end 808 has tapered out to wider dimension 818. In this example, the gap 806 includes a first portion 806A near the ABS with substantially parallel sides, and a tapered portion 806B. In the illustrated NFT 802, the wider portion 812 tapers linearly from first end 808 to second end 816, however this two-stage profile could be similarly applied to other features of the core geometry, including the wider portion 812. The change in the gap along the y-direction in the tapered sections could be any linear or nonlinear profile. This configuration 802 may improve the impedance match and exhibit improved efficiency under some conditions.

Figure 8B:
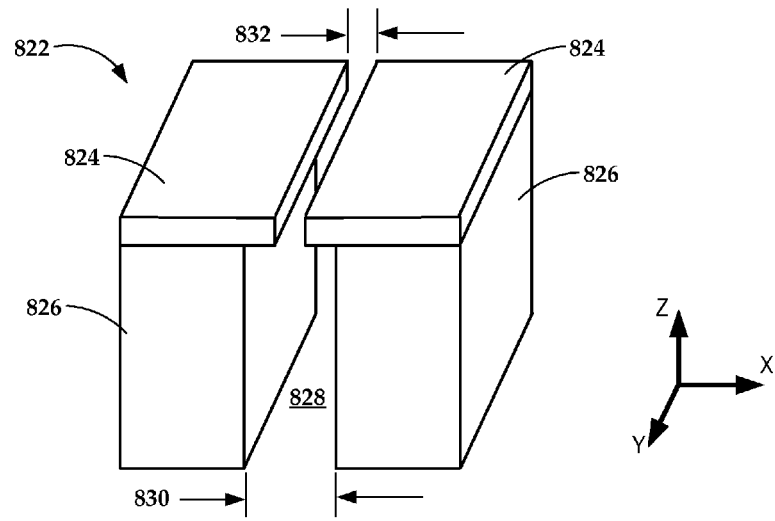

In reference now to FIG. 8B, a perspective view illustrates a NFT configuration 822 according to another example embodiment. This configuration includes metallic elements 824, 826 on either side of a core 828 (e.g., dielectric core). The core 828 includes a wider portion 830 and a narrower slot 832. Light is evanescent through the slots 830, 832. The metallic elements 824, 828 may be formed as a homogenous material, or could be made from different materials. Efficiency may be improved if, for example, the top portions 824 are formed from Au and the bottom portion is formed from Cu. As with the configuration 802 in FIG. 8A, the core 828 in configuration 822 could be tapered in the y-direction.

Figure 9:
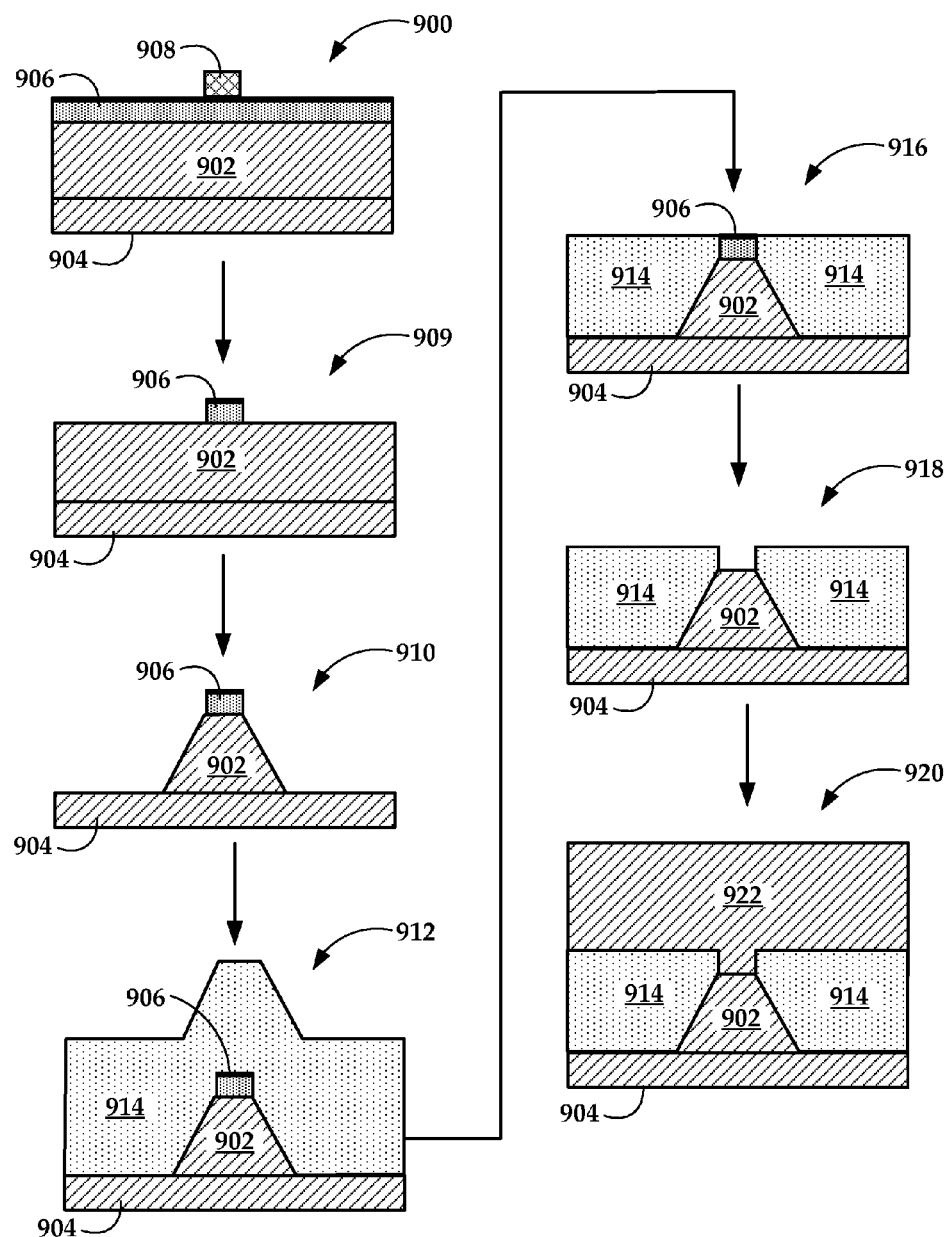
FIG. 9 is a process diagram illustrating a wafer process sequence that could be used in making a near-field transducer according to the various embodiments.

In reference now to FIG. 9, a process diagram illustrates an example wafer process sequence that could be used in making a waveguide NFT such as is shown in FIGS. 1B, 8A, and 8B. Referring first to stage 900, two layers 902, 904 of waveguide dielectric material (e.g., $Al_2O_3$, $SiO_2$) are overlaid with a hardmask (e.g. tantalum/amorphous carbon) 906. The layers 902, 904 may be laid on top of other layers (not shown) that are ultimately built up from a common, substantially planar substrate (e.g., the substrate being planar within manufacturing tolerances associated with the relevant processes). The hardmask materials are used as an inductively coupled plasma (ICP) etch hardmask and chemical-mechanical planarization/polishing (CMP) stop layer. A photoresist 908 is placed over the hardmask 906 to define a first (e.g., narrow) portion gap (e.g., gap 122 in FIG. 1B) of the NFT waveguide core. The photo resist 908 is elongated (e.g., a line) in a direction perpendicular to the page. The photoresist 908 determines the width of the narrow portion of the gap, while the thickness of the hardmask 906 defines the height of the narrow portion of gap (e.g., dimension 126 in FIG. 1B).

At stage 909, the line pattern defined by the photoresist 908 has been transferred to the hardmask layers 906 by either mill, etch or both. The photo resist 908 is stripped after the etch. At stage 910, an ICP etch has been used to etch into layer 902 with the desired wall angle and to a target depth (dimension 132 minus dimension 126 in FIG. 1B). The remaining portion of the layer 902 forms a second portion of the gap. At stage 912, an Au film 914 is filled in to cover the etch-out area by sputter deposition and/or by plating. At stage 916, the wafer been planarized and stopped on the hardmask layer 906. At stage 918, the hardmask layer 906 has been removed by etch, which is selective to the dielectric material in the field and to the Au film. At stage 920, the void left by the removed hardmask layer 906 has been backfilled with waveguide dielectric film 922 and buffed in order to give good step-height coverage over the Au geometry if necessary.

An alternative design and corresponding process would involve forming the sloped wall by using the sloped wall process described above, letting the wall cut right down through the NFT, and then depositing a dielectric to form the NFT-to-pole spacing. If the dielectric is confined to near the gap, this would also allow the NFT to connect directly to the pole outside the gap region and allow the pole to act as a heat sink for the NFT. The material properties can be chosen to give a good coupling efficiency and to reduce the coupling to the pole, since it wouldn't need to be a low loss material (low k), since it isn't part of the waveguide.

In reference now to FIGS. 10A-10D, additional configurations of an NFT and associated recording poles are shown. FIGS. 10A and 10C represent views of respective waveguide NFTs 1002, 1004 and recording poles 1006, 1008 on an ABS plane. Waveguide NFT 1002 may be configured similar to those shown in FIGS. 1B and/or 8A, and NFT 1004 may be configured as shown in FIG. 8B. In FIGS. 10B and 10D, cross sectional views represent yz-plane cross sections near respective air bearing surfaces 1014, 1016 that may be applicable to both NFT configurations shown in FIGS. 10A and 10C.

As seen in FIGS. 10B and 10D, the recording poles 1006 may take on alternate geometries near the air-bearing surface. Because the surface of the NFTs 1002, 1004 adjacent the poles 1006, 1008 are flat, the writer can employ features to achieve a large field with fast rise time. Optical delivery components 1010, 1012 (e.g., SIMs, waveguides) are also shown positioned adjacent to the NFTs 1002, 1004.

Figure 11:
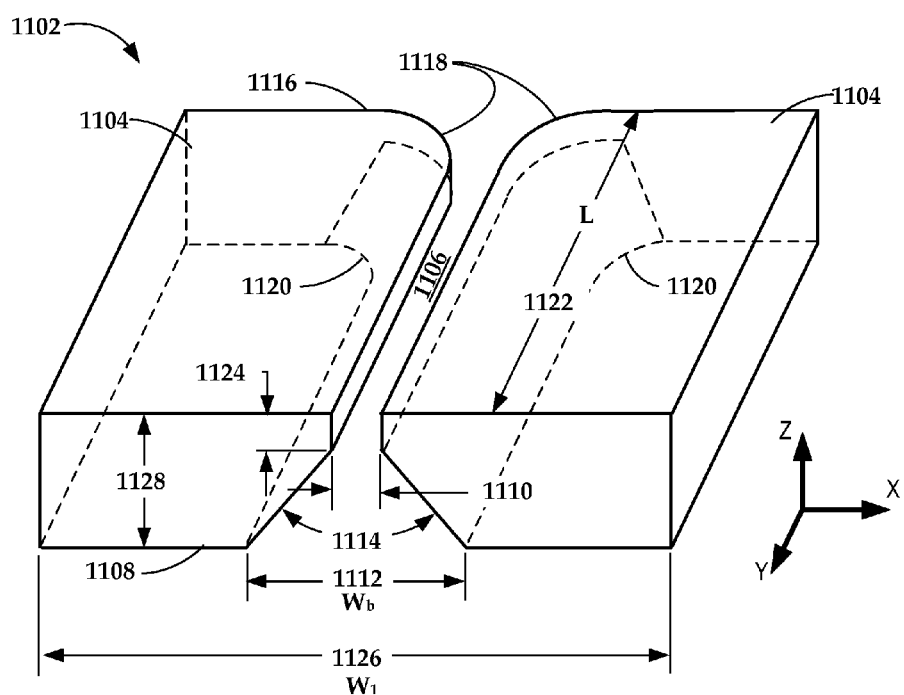
FIG. 11 is a perspective view of a waveguide near-field transducer according to another example embodiment.

In reference now to FIG. 11, a perspective view illustrates a waveguide NFT configuration 1102 according to another example embodiment. As with the previous configuration, the NFT 1102 includes metal elements 1104 that surround a dielectric gap 1106. The metal elements 1104 may be made of a plasmonic material, e.g., gold, silver. At a first end 1108 of the NFT 1102 (e.g., output end that faces the ABS) the gap 1106 includes a narrow portion 1110 that transitions to a wider portion 1112 (bottom gap width $W_b$) at angle 1114.

At the opposite end 1116 of the waveguide 1102 (e.g., end that faces the SIM and/or light delivery waveguide), the corners of the metal elements 1104 near the gap 1106 are tapered using rounded edges. Radiuses 1118 taper the narrow portion 1110 of the gap, and radiuses 1120 taper the wider portion 1112 of the gap 1106. While the rounded edges 1118, 1120 may be described and modeled as circular radiuses herein, it will be appreciated that the rounded edges 1118, 1120 may conform to any smooth profile, such as parabolic, logarithmic, exponential, etc. Further, similar rounded edges may be applied elsewhere to the NFT 1102, such as edges near input end 116 facing away from the gap 1106. The NFT 1102 may be formed using previously described processes, e.g., as shown in FIG. 9.

This configuration 1102 with tapers 1118, 1120 may exhibit improved impedance matching with optical delivery components (e.g., SIM and/or waveguide). For example, if large light reflection occurs at the entrance end 1116 of the NFT 102, less energy is delivered via the plasmonic elements 1104, reducing NFT efficiency. The rounded corners 1118, 1120 are one feature that may help improve impedance matching, thereby helping to increase optical power delivery efficiency.

To reduce impedance mismatches, the rounded edges 1118, 1120 result in the gap 1106 having a smoothly tapered profile along light propagation direction (y-direction). Due to this taper, the effective mode index of the NFT gradually increases, which reduces the light reflection at the NFT entrance. Moreover, as distance from the input end 1116 increases, the NFT waveguide mode index increases, which focuses the incident beam laterally into the gap 1106. The straight shape of the gap following the rounded edges 1118, 1120 afterward helps ensure that the optical spot size across the gap 1106 does not change.

To demonstrate the performance of this NFT design 1102, the dimensions are optimized by varying the bottom gap width 1112 ($W_b$) and the ridge waveguide length 1122, with light wavelength λ set to 830 nm, top gap 1110 size set to 20 nm, and gap angle 1114 set to 30°. Also in this modeling, the thickness 1124 of the top gap was set to 0 and total NFT width 1126 ($W_1$) was set to 680 nm. The NFT height 1128 was also set to a fixed value of 448 nm. A first set of results (shown in FIGS. 12A and 12B) was obtained for the configuration 1102 without the rounded edges 1118, 1120, and then a second set of results (in FIGS. 13A and 13B) was obtained with the rounded edges 1118, 1120.

Light was modeled as being delivered to the NFT 1102 by a planar waveguide (e.g., waveguide 101 in FIGS. 1A and 2) having a 150-nm thick Ta2O5 core of index of refraction n=2.09, and cladded by $Al_2O_3$ of n=1.65. The NFT core in gap 1106 was also $Al_2O_3$ and cladded by elements 1104 formed of gold metal. The PSIM (e.g., PSIM 102 in FIG. 1A) was modeled as 50-μm wide at the top opening and 100-μm long. Normal to the waveguide plane, the incident beam on the PSIM is a fundamental TE mode; parallel to the waveguide plane it is Gaussian with $1/e^2$ intensity radius of 24 μm. The total optical power flowing onto the PSIM is 1 watt. The storage media was modeled as a 12.6-nm thick FePtCuC magnetic layer of n=2.54+j 1.527 and a 20-nm thick MgO layer of n=1.7 on a silicon substrate. The head-medium spacing (HMS) is 8-nm with effective index of refraction n=1.2116.

Figure 12:
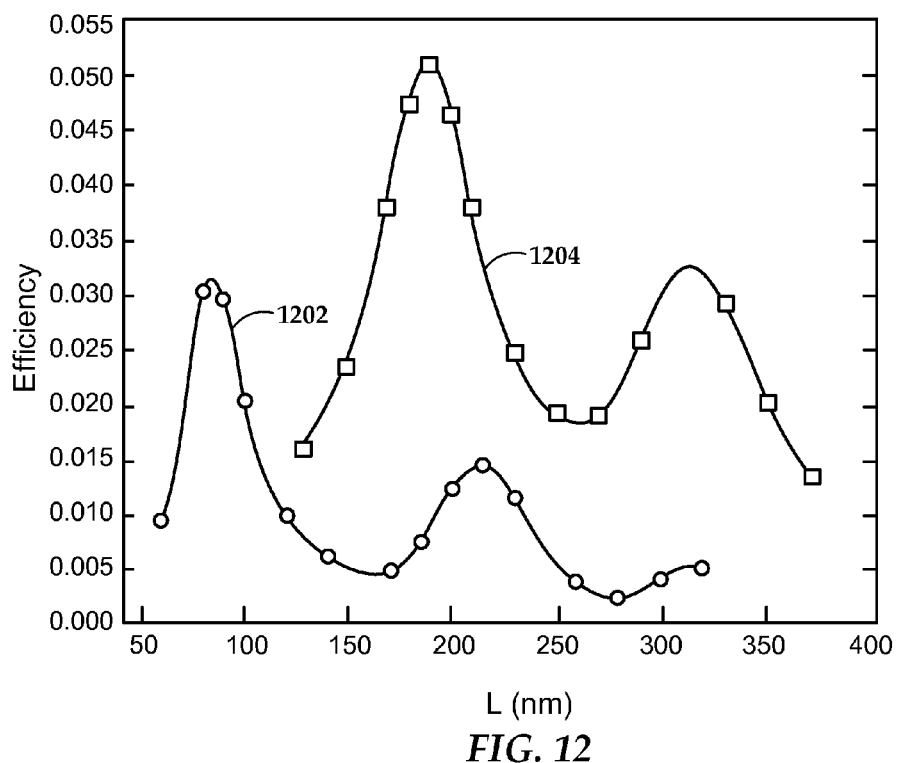
FIGS. 12, 13A and 13B are graphs comparing absorption efficiency of the near-field transducer of FIG. 11 and without rounded edges near the gap as a function of varying transducer length and width.

In FIG. 12, curve 1202 shows the computed light absorption efficiency in a 50 nm by 50 nm footprint of a media storage layer as a function of NFT length 1122, with the bottom gap width 1112 ($W_b$) set to 260 nm and NFT height 1128 set to 448 nm. In this curve 1202, there were no rounded edges 1118, 1120 at input end 1116 of the NFT 1102. To see the differences in efficiency due to the rounded edges 1118, 1120, a second model included quarter-circled shapes at the NFT entrance with radius of curvature R=150 nm. The results of this simulation are represented in FIG. 12 by curve 1204, which shows the media absorption efficiency as a function of NFT length 1122 (NFT width of 680 nm is the locally optimized size for the results of curve 1204).

Figure 13A:
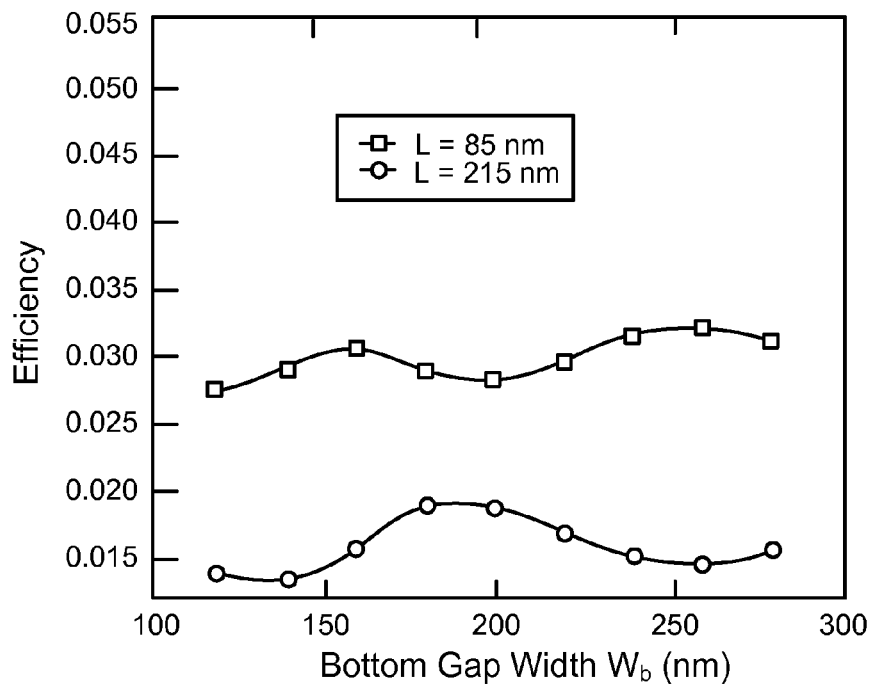

In FIG. 13A, a graph shows a similar light absorption efficiency as described in relation to FIG. 12, except that efficiency is presented a function of bottom gap width 1112 ($W_b$) for an NFT without rounded edges 1118, 1120. For this graph, NFT width 1126 ($W_1$) of 680 nm is used, and NFT lengths 1122 (L) are set to 85 nm and 215 mm. It can be seen that two modes appear at L<300 nm. The optical efficiency of the first mode, at NFT length of 85 nm, peaks at a bottom gap width of 260 nm, while the second mode, at NFT length of 215 nm, peaks at a bottom gap width of 180 nm. The highest efficiency seen here is around 0.032.

Figure 13B:
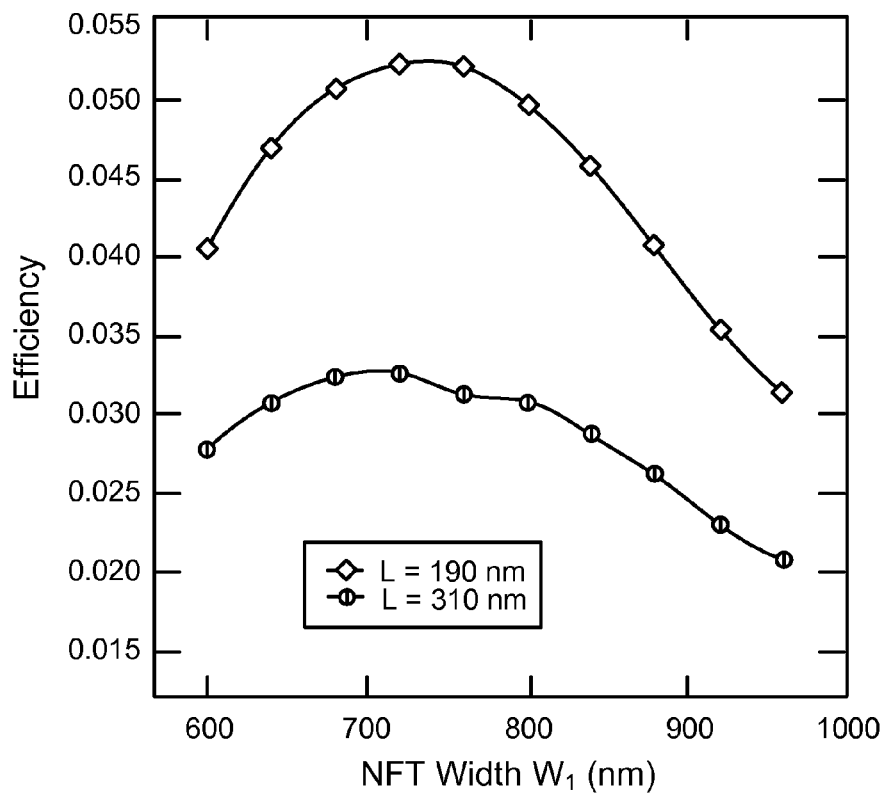

In FIG. 13B, a graph show the efficiency as a function of NFT overall width 1126 ($W_1$) for two peak NFT lengths (190 nm and 310 nm, respectively) for an NFT with rounded edges 1118 and a bottom gap width 1112 ($W_b$) of 260 nm. It is evident that two modes are also observed at NFT lengths 1122 (L) of 190 nm and 310 nm, respectively. The efficiency of the first mode seen in FIG. 13B is increased to 0.052 at an optimal width 1126 of around 760 nm. While FIGS. 13A and 13B show efficiency as a function of different geometric features ($W_b$ versus $W_1$), the graphs generally illustrate an increase in efficiency using rounded edges 1118, 1120. Greater efficiencies may be possible based upon further optimization analyses. Such optimizations may involve varying, for example, dimensions 1112, 1122, and 1126 and a shape of the rounded edges 1118, 1120 for a desired wavelength.

The results described above assumed light delivery via a planar waveguide and SIM. Other delivery mechanisms are contemplated for exciting the NFT according to any of the previously described configurations. For example, an NFT could also be excited by a dielectric channel waveguide. An example of a channel waveguide arrangement is seen in the graph 1402 of FIG. 14A, which shows dimensions and arrangement of components in an xy-plane (using an analogous coordinate system as in previous examples). The graph 1402 shows an NFT 1404 with a rounded, tapered input end at and input portion of a gap 1405, similar to that shown in FIG. 11. The NFT 1404 in this example is rounded both near and away from the gap. One end of a channel waveguide 1406 is proximate the input end of the NFT 1404. An output end of the NFT 1404 is proximate a media surface 1406.

Figure 14A:
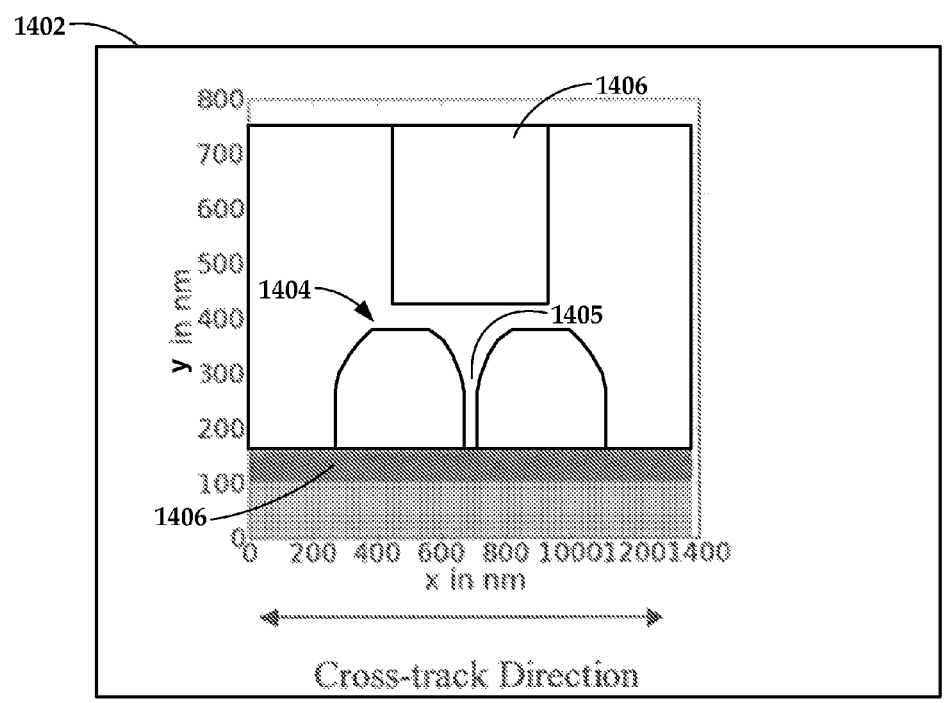
FIG. 14A is a graph illustrating dimension and arrangement of a channel waveguide proximate a near-field transducer according to an example embodiment.
Figure 14B:
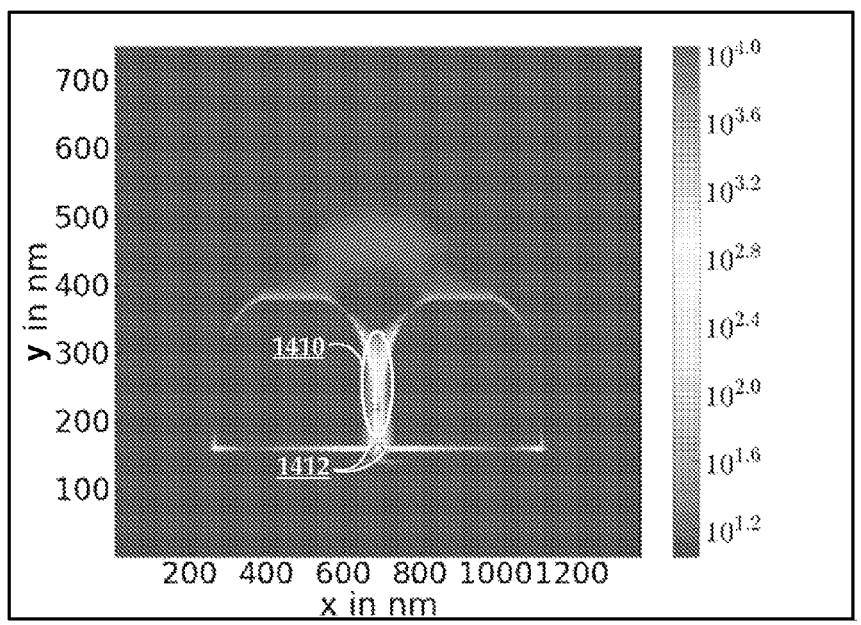
FIG. 14B is a field intensity plot of the waveguide and near-field transducer arrangement shown in FIG. 14A.

The geometry of the NFT 1404 is similar to what has been described earlier. The cross-section for the channel waveguide 1406 used in this modeling is 475 nm (cross-track)×285 mm (down-track). These parameters are merely representative, they are not intended to be limiting. The core of the waveguide was modeled as Tantalum, although this material choice is not intended to be limiting either. The computed electric field intensity for the geometry of FIG. 14A is shown in FIG. 14B. Generally, the field intensity is in the range of $10^{2.4}$ to $10^{3.2}$ in region 1410 along the gap of the NFT 1404, where it reaches a peak of about $10^4$ proximate the surface of the media 1406 at regions 1412.

The regions of high field intensity seen in FIG. 14B may also be generally indicative of regions of high temperature, as some of the light is absorbed in the NFT 1404 due to the Joule effect. This temperature increase can also be seen in the thermal modeling results shown in FIGS. 7A-7B, which shows highest temperatures near the NFT gap. As described above, a portion of the NFT exposed to the ABS can dissipate heat generated in the NFT. In the discussion that follows, additional heat dissipation methods/structures are described that can further assist in heat dissipation and with minimal penalty to (or possibly enhancement of) NFT efficiency.

In embodiments shown in FIGS. 15A-15F and 16A-16D, a separate heat sink may be used to assist drawing heat away from an NFT 1500, either alone or in combination with a recording pole. These may have enough thermal mass to dissipate heat away from the NFT (e.g., away from the ABS) to reduce peak temperatures at the NFT gap. The heat sink and/or recording poles may also be able to dissipate heat (e.g., via convection) at the ABS. Generally, a material (e.g., dielectric) that fills the NFT gap may also be chosen to have high thermal conductivity and/or low thermal interface resistance where this material interfaces with the NFT elements, heat sink, and/or recording poles. A spacer material between heat sink and pole might be used to prevent pole corrosion.

Figure 16A:
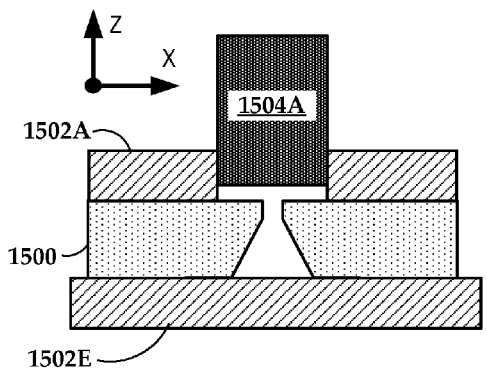

In FIG. 15A, a cross-sectional diagram illustrates an example of heat sinking features proximate NFT elements 1500 at a plane parallel to the ABS according to an example embodiment. For convenience, the same reference numeral will be used to refer generally to an NFT in FIGS. 15A-15F, 16A-16D, which illustrate heat sink configurations according to example embodiments. The NFT 1500 in FIGS. 15A-15D and 16A-16D may include any features and/or geometry previously shown and described, e.g., in FIGS. 1A-1B, 7A-7B, 8A-8B, and 11. The diagrams of FIGS. 15A-15D and 16A-16D use the same reference axis as shown in FIGS. 15A and 16A.

The NFT 1500 in FIG. 15A is proximate a recording pole 1504A, which may taper/slant towards the NFT 1500 near the ABS such as shown in, e.g., FIGS. 2, 10B, and 10D. This can be done by letting the sloped pole cut down through the NFT (e.g., intersecting with the NFT) and only putting a dielectric material in the NFT-pole spacer near the gap (see discussion of FIG. 17 below). A heat sink 1502A includes portions proximate the NFT on either side of the recording pole 1504A. In FIG. 15B, an alternative arrangement includes heat sink 1502B between the NFT 1500 and recording pole 1504B. The configuration of the heat sink 1502B allows pole tip 1504B to be wider (in the cross track direction) than pole tip 1504A. To reduce impact on NFT efficiency, the length of the heat sinks 1502A, 1502B in the x-direction can be optimized to yield desirable NFT characteristics. In one implementation, 1502A was around 400 nm wider than NFT 1500 along x-direction, and NFT efficiency improved by 35%.

Another option is shown in FIGS. 15C and 15D, which show analogous configurations to FIGS. 15A and 15B, respectively. The recording poles 1504A and 1504B in FIGS. 15C and 15D may be similarly shaped/configured as those in FIGS. 15A and 15B, except that heat sinks 1502C and 1502D surround the recording poles 1504A, 1504B. The heat sinks 1502C, 1502D may have alternate outer profiles, as illustrated by dashed line 1506 around heat sink 1502C. A similar outer profile could be used around heat sink 1502D.

Figure 16B:
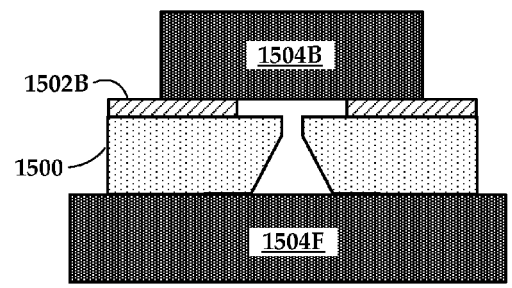
Figure 16C:
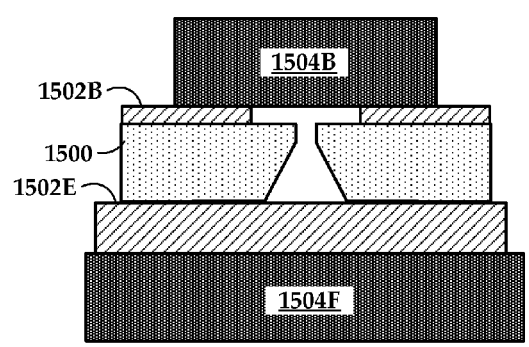
Figure 16D:
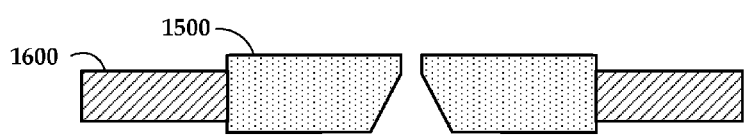

In other embodiments shown in FIGS. 15E and 15F, respectively, a heat sink 1502E and/or pole material 1504F (e.g., return pole) can be coupled to NFT 1500 away from the narrow part of the NFT gap. This can be combined with other heat sink/pole arrangements, as shown in FIGS. 16A-16D. In FIG. 16A, a bottom-side heat sink 1502E is combined with top-side heat sink 1502A together with narrow pole 1504A. In FIG. 16B, wide recording pole 1504B is separated from NFT 1500 by heat sink 1502B and further combined with return pole 1504F. A similar arrangement is shown in FIG. 16C, except that bottom heat sink 1502E is placed between NFT 1500 and return pole 1504F. Finally, FIG. 16D shows an alternate configuration with a heat sink 1600 extending from the sides of the NFT 1500 opposite the gap.

In any of the embodiments shown in FIGS. 15A-15F and 16A-16D, the heat sinks can be formed from a material with high thermal conductivity, such as Au or Cu, and/or alloys of these materials. The heat sinks may also be formed from a material that is thermally and/or mechanically stable such as Cr, Ru, W, etc., which may provide a trade-off between thermal conductivity and thermal and mechanical stability. In one configuration, the outer edges of the heat sinks (e.g., perimeter 1506 shown in FIG. 15C) could be lined with a heat conductive material such as Au, and the center could be filled with a mechanically stable/robust material such as those mentioned above. This two-part construction may be employed if the illustrated cross sections are at or near the ABS.

The heat sinks may be more effective in removing heat if located at or near the ABS. In configurations where the heat sinks are proximate the NFT gap (e.g., FIGS. 15A-15D and 16A-16C) the heat sinks may be separated from the NFT gap by a small distance. In such a case, the conductive paths to the heat sink would be small, and convection from the ABS could help dissipate heat in this region. Portions of the NFT away from the NFT gap could be made significantly thicker, and the sloped pole portions could cut down through these thickened portion. This could be used to form a heat sink about the same size as the NFT.

Figure 17A:
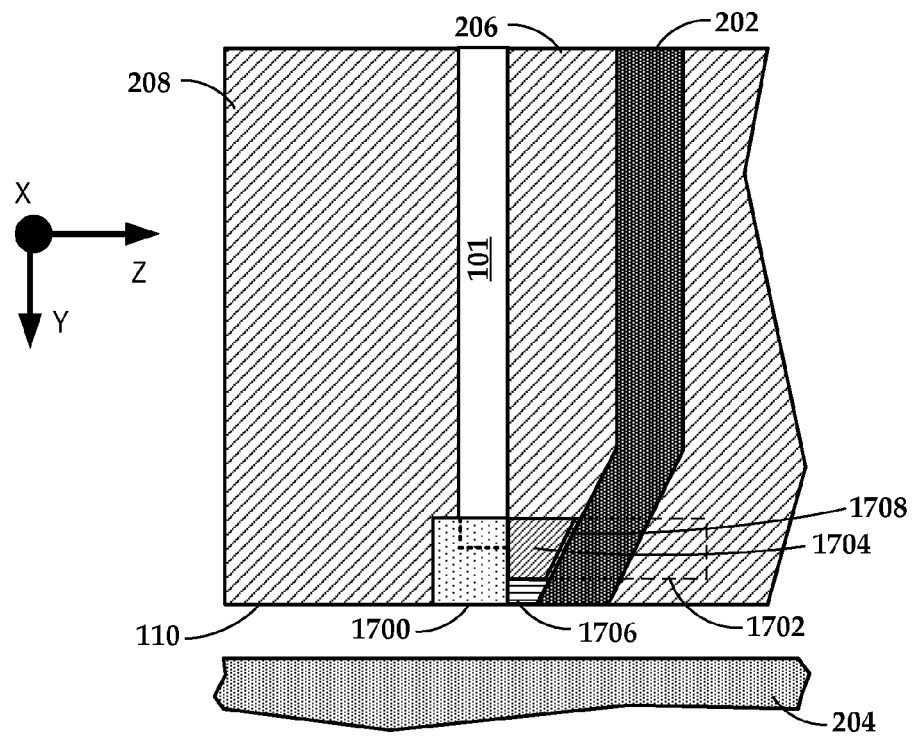

In reference now to FIG. 17A, a cross-sectional diagram illustrates a configuration of a heat sink proximate an NFT according to an example embodiment. Analogous components to those shown in FIG. 2 are given like reference numerals in FIG. 17A. In this figure, NFT 1700 may take on any configuration previously shown and discussed. Similarly, a heat sink 1704 may be located proximate the NFT 1700 in any of the configurations shown above, including those with heat sink components between the NFT 1700 and a return pole (not shown). For example the heat sink 1704 may wrap fully or partially around the recording pole 202, as indicated by dashed line 1702.

The heat sink 1702 may be made from a dielectric material, such as MgO, that has a high thermal conductivity. Such a material might not be usable all the way to the ABS 110 due to, for instance, corrosion. So a dielectric material 1706 may be placed near the ABS to block the heat-sink 1704 from exposure to the ABS 110. This layer 1706 could extend around any portions (e.g., portion 1702) where the heat sink 1704 could be exposed to the ABS 110. For similar reasons, a spacer 1708 may be placed between the recording pole 202 and heat sink 1704. This spacer 1708 could extend around any portions (e.g., portion 1702) where the heat sink 1704 would directly contact the pole 202. Similar accommodations could be made to heat sink portions near a return pole (not shown).

Figure 17B:
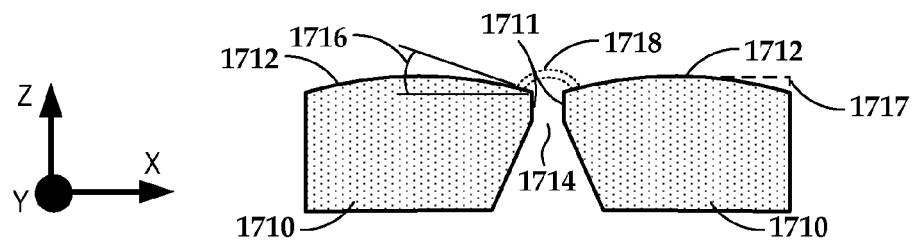
FIGS. 17B and 17C are front views of plasmonic near field transducer elements according to additional example embodiments.
Figure 17C:
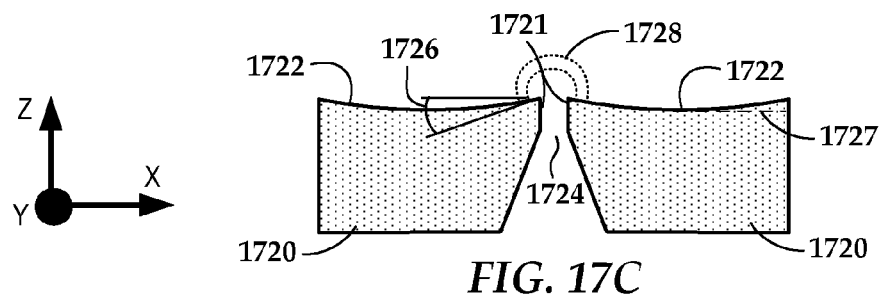

In reference now to FIGS. 17B-17C, a front view (e.g., taken from a plane parallel the ABS 110) of plasmonic NFT elements 1710, 1720 shows shape variations according to additional example embodiments. These elements 1710, 1720 include curvatures along an edge where gap-facing surfaces 1711, 1721 intersect top surfaces 1712, 1722 of the elements 1710, 1712. The top surfaces 1712, 1722 generally lie along (e.g., substantially parallel to) one or more substrate-parallel planes and may face a recording pole (see, e.g., FIG. 15A). In FIG. 17B, the NFT elements 1710 include a convex curvature on top surfaces 1712 of the elements 1710 proximate plasmon gap 1714. At least the portion of the element 1710 near the gap 1714 is curved/chamfered, as indicated by non-right angle 1716. The opposing corners may also have a non-right angle as shown, or may include a right angle as shown by dashed line 1717.

In FIG. 17C, NFT elements 1720 include a concave curvature on top surfaces 1722 of the elements 1720 proximate a plasmon gap 1724. An angle of curvature 1726 is indicated at least near the gap 1724, and the opposite corner may include a similar angle, or remain right angled, as indicated by dashed line 1727. These non-right, edge angles 1716, 1726 may be maintained along the entire length (in the y-direction) of the elements 1710, 1720, or only be proximate the output ends (e.g., ends near the ABS). These curvatures need not be smooth, e.g., may be approximated using straight lines, flat surfaces, etc.

The angles 1716, 1726 near the respective NFT gaps 1714, 1724 will tend to modify the curvature of the electric field lines between the gaps, as represented by field lines 1718 and 1728, respectively. The gap of the NFT is orders of magnitude smaller than the wavelength of light in the waveguide dielectric materials. At such small distances, the optical fields may behave like electrostatic fields. Assuming there is a symmetric localized charge distribution in the metal at the corner of the gaps 1714, 1724 (e.g., symmetric but of opposite sign), the electric field lines 1718, 1728 will start curving outside the gaps 1714, 1724. As the convex corner angle 1716 increases, the curvature in the field lines 1718 start decreasing. Conversely, as concave angle 1726 increases, the curvature of electric field lines 1728 will increase. For a right angle edge (e.g., where angles 1716 and/or 1726 are zero), curvature of the electric field will be between the curvatures of fields 1718 and 1728.

These different fields 1718, 1728 may affect temperature profiles in the recording media, which in turn affects the recording transitions in the media. By tuning the fields 1718, 1728 via angles 1716, 1726, recording transition curvatures can be altered so as to increase the linear recording density. The intensity of the electric field will approximately manifest itself as the temperature in the recording medium. Thus the recording transitions can be altered to increase the recording density. An example of how the angle of curvatures can affect temperature profiles is shown in the analysis depicted in FIGS. 18A-18C.

Figure 18C:
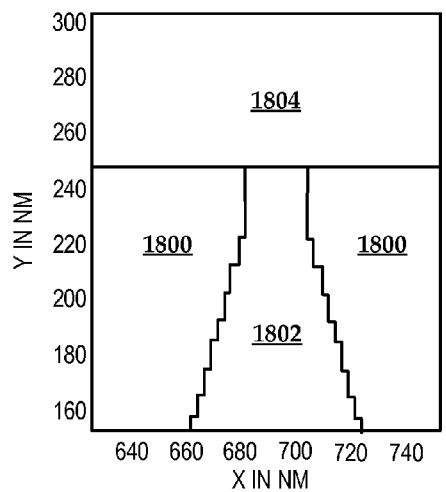
FIG. 18C is a graph comparing temperature profiles in a recording material based on the analytical models of FIGS. 18A and 18B.
Figure 18C:
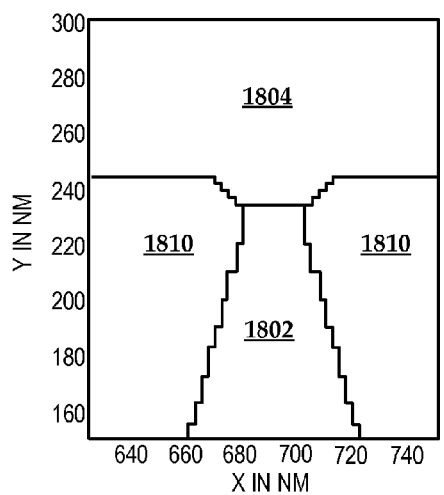
Figure 18C:
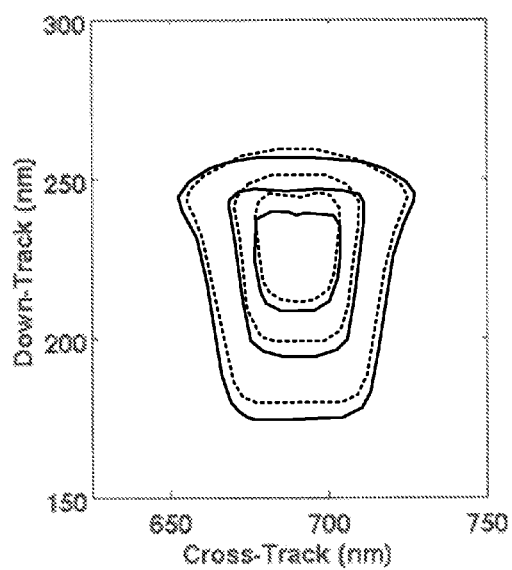

In FIGS. 18A and 18B, graphs illustrated analytical models used to predict temperature profiles in a recording media. In FIG. 18A, NFT portions 1800 (here modeled as gold, although other materials may be used such as Ag, Cu) have a 90-degree corner near the gap. The gold portions 1800 are surrounded by gap material 1802 and top cladding/dielectric material 1804. In FIG. 18B, NFT portions 1810 (also modeled as gold) have an angled/rounded profile (e.g., approximately 45 degrees) near the gap, and are surrounded by similar gap and cladding materials 1802, 1804 as described for FIG. 18A. The graph of FIG. 18C represents expected temperature profiles in a recording material based on these two different configurations 1800, 1810.

In FIG. 18C, the dashed and sold lines represent isotherms of the optical spots created in a media using variations 1800 and 1810, respectively. Each of the isotherm contours represent (from smallest to largest) temperatures of 75%, 50% and 25% of peak. The solid-line contours (corresponding to variation 1810) are smaller in the down-track direction than the dashed-line contours (corresponding to variation 1800). Another aspect of the variation 1810 is that there may be a drop in the NFT temperature due to the larger surface area available for heat dissipation from the gap, compared to variation 1800.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
a waveguide configured to deliver light to a transducer region;
a plasmonic transducer that includes at least one metal plate element having an input end disposed proximate the transducer region;
a recording pole proximate the plasmonic transducer at the air-bearing surface;
a heat sink between the plasmonic transducer and the recording pole, surrounding at least three sides of the recording pole, and extending along at least one side of the recording pole that does not face the plasmonic transducer; and
an air-bearing surface disposed at an angle to the substrate-parallel plane, wherein an output end of the at least one metal plate element is disposed proximate the air-bearing surface, wherein the plasmonic transducer is configured to provide a surface plasmon-enhanced near-field radiation pattern proximate the output end in response to the light received at the transducer region.

2. The apparatus of claim 1, wherein the plasmonic transducer comprises a second metal plate element separated from the first metal plate element by a gap.

3. The apparatus of claim 1, wherein the recording pole is tapered towards the air-bearing surface.

4. The apparatus of claim 1, wherein the heat sink is formed of a heat sink material that is more mechanically robust than a plasmonic material used to form the plasmonic transducer.

5. The apparatus of claim 4, wherein the heat sink material comprises at least one of Cr, Ru, and W.

6. The apparatus of claim 1, wherein a portion of the heat sink is disposed between the plasmonic transducer and the recording pole.

7. The apparatus of claim 1, further comprising a return pole disposed proximate the plasmonic transducer opposite the recording pole, wherein the plasmonic transducer is thermally coupled to the return pole.

8. The apparatus of claim 7, further comprising a second heat sink between the return pole and the plasmonic transducer.

9. The apparatus of claim 1, further comprising a second heat sink proximate a surface of the plasmonic transducer that is opposite the recording pole.

10. An apparatus comprising:
a waveguide configured to deliver light to a transducer region;
a plasmonic transducer that includes at least one metal plate element having an input end disposed proximate the transducer region;
a recording pole proximate the plasmonic transducer at the air-bearing surface;
a return pole disposed proximate the plasmonic transducer opposite the recording pole;
a heat sink between the plasmonic transducer and the return pole; and
an air-bearing surface disposed at an angle to the substrate-parallel plane, wherein an output end of the at least one metal plate element is disposed proximate the air-bearing surface, wherein the plasmonic transducer is configured to provide a surface plasmon-enhanced near-field radiation pattern proximate the output end in response to the light received at the transducer region.

11. The apparatus of claim 10, wherein the plasmonic transducer comprises a second metal plate element separated from the first metal plate element by a gap.

12. The apparatus of claim 10, wherein the recording pole is tapered towards the air-bearing surface.

13. The apparatus of claim 10, wherein the heat sink is formed of a heat sink material that is more mechanically robust than a plasmonic material used to form the plasmonic transducer.

14. The apparatus of claim 13, wherein the heat sink material comprises at least one of Cr, Ru, and W.

15. The apparatus of claim 10, further comprising a second heat sink between the recording pole and the plasmonic transducer.

16. An apparatus comprising:
a waveguide configured to deliver light to a transducer region;
a plasmonic transducer that includes at least one metal plate element having an input end disposed proximate the transducer region;
a recording pole proximate the plasmonic transducer at the air-bearing surface;
a return pole disposed proximate the plasmonic transducer opposite the recording pole and thermally coupled to the plasmonic transducer;
a heat sink between the plasmonic transducer and the recording pole; and
an air-bearing surface disposed at an angle to the substrate-parallel plane, wherein an output end of the at least one metal plate element is disposed proximate the air-bearing surface, wherein the plasmonic transducer is configured to provide a surface plasmon-enhanced near-field radiation pattern proximate the output end in response to the light received at the transducer region.

17. The apparatus of claim 16, wherein the plasmonic transducer comprises a second metal plate element separated from the first metal plate element by a gap.

18. The apparatus of claim 16, wherein the heat sink is formed of a heat sink material that is more mechanically robust that a plasmonic material used to form the plasmonic transducer.

* * * * *